United States Patent
Keithley et al.

(10) Patent No.: US 10,424,008 B2
(45) Date of Patent: *Sep. 24, 2019

(54) METHOD AND SYSTEM FOR ENGAGING IN A TRANSACTION BETWEEN A BUSINESS ENTITY AND A MERCHANT

(71) Applicant: PAYPAL, INC., San Jose, CA (US)

(72) Inventors: Thomas H. Keithley, Monkton, MD (US); Thomas E. Whitford, Newark, DE (US)

(73) Assignee: PAYPAL, INC., San Jose, CA (US)

( * ) Notice: Subject to any disclaimer, the term of this patent is extended or adjusted under 35 U.S.C. 154(b) by 256 days.

This patent is subject to a terminal disclaimer.

(21) Appl. No.: 14/270,145

(22) Filed: May 5, 2014

(65) Prior Publication Data
US 2014/0316950 A1   Oct. 23, 2014

Related U.S. Application Data

(63) Continuation of application No. 12/142,329, filed on Jun. 19, 2008, now Pat. No. 8,719,164.

(51) Int. Cl.
*G06Q 30/06* (2012.01)
*G06Q 20/12* (2012.01)

(52) U.S. Cl.
CPC ......... *G06Q 30/0637* (2013.01); *G06Q 20/12* (2013.01); *G06Q 30/0601* (2013.01); *G06Q 30/0603* (2013.01)

(58) Field of Classification Search
USPC ........................................................ 705/44
See application file for complete search history.

(56) References Cited

U.S. PATENT DOCUMENTS

| 3,920,908 A | 11/1975 | Kraus |
| 4,191,860 A | 3/1980 | Weber |
| 4,291,198 A | 9/1981 | Anderson et al. |
| 4,757,267 A | 7/1988 | Riskin |
| 4,969,183 A | 11/1990 | Reese |
| 4,996,705 A | 2/1991 | Entenmann et al. |

(Continued)

FOREIGN PATENT DOCUMENTS

| EP | 0338568 A2 | 10/1989 |
| EP | 0829813 A1 | 3/1998 |

(Continued)

*Primary Examiner* — Hani M Kazimi
*Assistant Examiner* — Hatem M Ali

(57) ABSTRACT

A computer-implemented method of engaging in a transaction between a merchant and a business entity. The method includes: initiating a transaction by the business entity with a merchant; obtaining, by the merchant, a business entity data set including at least one data field; communicating an authorization request from the merchant to a provider, the request including at least one data field from the business entity data set and at least one field from a transaction data set; establishing a credit-based relationship between the provider and the business entity; communicating an authorization response from the provider to at least one of the merchant and the business entity; and engaging in the transaction between the provider and the business entity based at least in part upon the established credit-based relationship. A system and apparatus are also disclosed.

20 Claims, 16 Drawing Sheets

(56) References Cited

U.S. PATENT DOCUMENTS

| | | | |
|---|---|---|---|
| 5,010,238 A | 4/1991 | Kadano et al. | |
| 5,012,077 A | 4/1991 | Takano | |
| 5,120,945 A | 6/1992 | Nishibe et al. | |
| 5,329,589 A | 7/1994 | Fraser et al. | |
| 5,446,885 A | 8/1995 | Moore et al. | |
| 5,537,315 A | 7/1996 | Mitcham | |
| 5,793,028 A | 8/1998 | Wagener et al. | |
| 5,794,221 A | 8/1998 | Egendorf | |
| 5,870,721 A | 2/1999 | Norris | |
| 5,883,810 A | 3/1999 | Franklin et al. | |
| 5,940,811 A | 8/1999 | Norris | |
| 6,000,832 A | 12/1999 | Franklin et al. | |
| 6,029,150 A | 2/2000 | Kravitz | |
| 6,029,890 A | 2/2000 | Austin | |
| 6,032,136 A | 2/2000 | Brake, Jr. et al. | |
| 6,078,891 A | 6/2000 | Riordan et al. | |
| 6,098,053 A | 8/2000 | Slater | |
| 6,105,007 A | 8/2000 | Norris | |
| 6,122,624 A | 9/2000 | Tetro et al. | |
| 6,188,994 B1 | 2/2001 | Egendorf | |
| 6,202,053 B1 | 3/2001 | Christiansen et al. | |
| 6,227,447 B1 | 5/2001 | Campisano | |
| 6,289,319 B1 | 9/2001 | Lockwood | |
| 6,317,783 B1 | 11/2001 | Freishtat et al. | |
| 6,332,134 B1 | 12/2001 | Foster | |
| 6,341,724 B2 | 1/2002 | Campisano | |
| 6,351,739 B1 | 2/2002 | Egendorf | |
| 6,477,578 B1 | 11/2002 | Mhoon | |
| 6,505,171 B1 | 1/2003 | Cohen et al. | |
| 6,675,153 B1 | 1/2004 | Cook et al. | |
| 6,704,714 B1 | 3/2004 | O'Leary et al. | |
| 6,785,661 B1 | 8/2004 | Mandler et al. | |
| 6,820,202 B1 | 11/2004 | Wheeler et al. | |
| 6,839,690 B1 | 1/2005 | Foth et al. | |
| 6,839,692 B2 | 1/2005 | Carrott et al. | |
| 6,868,408 B1 | 3/2005 | Rosen | |
| 6,883,022 B2 | 4/2005 | Van Wyngarden | |
| 6,889,325 B1 | 5/2005 | Sipman et al. | |
| 6,915,272 B1 | 7/2005 | Zilliacus et al. | |
| 6,931,382 B2 | 8/2005 | Laage et al. | |
| 6,957,334 B1 | 10/2005 | Goldstein et al. | |
| 6,970,853 B2 | 11/2005 | Schutzer | |
| 6,976,008 B2 | 12/2005 | Egendorf | |
| 6,980,970 B2 | 12/2005 | Krueger et al. | |
| 7,006,986 B1 | 2/2006 | Sines et al. | |
| 7,051,001 B1 | 5/2006 | Slater | |
| 7,107,243 B1 | 9/2006 | McDonald et al. | |
| 7,177,836 B1 | 2/2007 | German et al. | |
| 7,263,506 B2 | 8/2007 | Lee et al. | |
| 7,406,442 B1 | 7/2008 | Kottmeier, Jr. et al. | |
| 7,831,521 B1* | 11/2010 | Ball | G06Q 20/02 235/375 |
| 2001/0034702 A1 | 10/2001 | Mockett et al. | |
| 2001/0034724 A1 | 10/2001 | Thieme | |
| 2002/0007302 A1 | 1/2002 | Work et al. | |
| 2002/0007341 A1 | 1/2002 | Lent et al. | |
| 2002/0032860 A1 | 3/2002 | Wheeler et al. | |
| 2002/0035538 A1 | 3/2002 | Moreau | |
| 2002/0052833 A1 | 5/2002 | Lent et al. | |
| 2002/0069166 A1 | 6/2002 | Moreau et al. | |
| 2002/0087467 A1 | 7/2002 | Mascavage, III et al. | |
| 2002/0099649 A1 | 7/2002 | Lee et al. | |
| 2002/0107793 A1 | 8/2002 | Lee | |
| 2002/0112160 A2 | 8/2002 | Wheeler et al. | |
| 2002/0120537 A1 | 8/2002 | Morea et al. | |
| 2002/0120864 A1 | 8/2002 | Wu et al. | |
| 2002/0156688 A1 | 10/2002 | Horn et al. | |
| 2002/0169694 A1* | 11/2002 | Stone | G06Q 10/00 705/5 |
| 2002/0178071 A1 | 11/2002 | Walker et al. | |
| 2002/0198822 A1 | 12/2002 | Munoz et al. | |
| 2003/0036996 A1 | 2/2003 | Lazerson | |
| 2003/0061157 A1 | 3/2003 | Hirka et al. | |
| 2003/0120615 A1 | 6/2003 | Kuo | |
| 2003/0144952 A1 | 7/2003 | Brown et al. | |
| 2003/0200184 A1 | 10/2003 | Dominguez et al. | |
| 2004/0078328 A1 | 4/2004 | Talbert et al. | |
| 2004/0111362 A1 | 6/2004 | Nathans et al. | |
| 2004/0151292 A1 | 8/2004 | Larsen | |
| 2004/0186807 A1 | 9/2004 | Nathans et al. | |
| 2005/0038715 A1 | 2/2005 | Sines et al. | |
| 2005/0071266 A1 | 3/2005 | Eder | |
| 2005/0125336 A1 | 6/2005 | Rosenblatt et al. | |
| 2005/0131808 A1 | 6/2005 | Villa | |
| 2005/0246278 A1 | 11/2005 | Gerber et al. | |
| 2006/0064372 A1 | 3/2006 | Gupta | |
| 2006/0106699 A1 | 5/2006 | Hitalenko et al. | |
| 2006/0178984 A1* | 8/2006 | Anderson | G06Q 20/04 705/39 |
| 2006/0178988 A1 | 8/2006 | Egendorf | |
| 2006/0184428 A1 | 8/2006 | Sines et al. | |
| 2006/0184449 A1 | 8/2006 | Eder | |
| 2006/0184570 A1 | 8/2006 | Eder | |
| 2006/0226216 A1 | 10/2006 | Keithley et al. | |
| 2006/0229974 A1 | 10/2006 | Keithley et al. | |
| 2006/0229996 A1 | 10/2006 | Keithley et al. | |
| 2006/0265335 A1 | 11/2006 | Hogan et al. | |
| 2006/0266819 A1 | 11/2006 | Sellen et al. | |
| 2006/0289621 A1 | 12/2006 | Foss, Jr. et al. | |
| 2007/0005445 A1 | 1/2007 | Casper | |
| 2007/0033139 A1* | 2/2007 | Handler | G06Q 20/10 705/44 |
| 2007/0038485 A1 | 2/2007 | Yeransian et al. | |
| 2007/0083444 A1* | 4/2007 | Matthews | G06Q 10/04 705/30 |
| 2008/0010073 A1 | 1/2008 | Li et al. | |
| 2008/0294547 A1 | 11/2008 | Zigman | |
| 2010/0312618 A1 | 12/2010 | Ramsdale et al. | |

FOREIGN PATENT DOCUMENTS

| | | |
|---|---|---|
| EP | 1223524 A2 | 7/2002 |
| WO | WO 88/10467 A1 | 12/1988 |
| WO | WO 00/02150 A1 | 1/2000 |
| WO | WO 00/67177 A2 | 11/2000 |

\* cited by examiner

METHOD AND SYSTEM FOR ENGAGING IN A TRANSACTION BETWEEN A BUSINESS ENTITY AND A MERCHANT

CROSS REFERENCE TO RELATED APPLICATION

This application is a continuation of Ser. No. 12/142,329 filed on Jun. 19, 2008, which is incorporated herein by reference in its entirety.

BACKGROUND

Field of the Invention

The present invention relates generally to credit systems and business entity, consumer, merchant, provider and credit issuer relationships and, in particular, to a method and system for engaging in a transaction between a business entity and a merchant, such as between a corporation, a proprietorship, a partnership, a company, a non-profit entity, a governmental entity, a municipal entity, a public entity and the like, and a merchant and based upon a relationship established with a provider, a credit issuer, a financial institution, and the like.

Description of the Related Art

In order to enable convenient purchases of goods and services by consumers, the financial service industry has developed many alternative payment methods that allow a consumer to engage in a transaction and receive goods and services on credit. For example, such alternative payment methods may include checks, ATM or debit cards, credit cards and/or charge cards, etc. Prior to the birth of virtual commerce, as discussed below, such payment options provided adequate convenience and transactional security to consumers and merchants in the marketplace. Virtual commerce and the growth of the Internet as a medium for commerce have placed pressure on the payment options discussed above on the convenience, transactional security and profitability by the credit issuer. Currently, available payment options include significant shortcomings when applied to remote purchasers, such as purchases where the buyer and the seller (that is, the merchant) are not physically proximate during the transaction. Specific examples of remote purchases are mail order, telephone order, the Internet and wireless purchases.

In a typical credit transaction and process, a consumer engages with a merchant at the point-of-sale, such as online at the merchant's website, at the merchant's business or store and/or over the telephone with the merchant's call/sales center, etc. The merchant sends a request to the credit issuer to obtain authorization or verification data allowing the consumer to consummate the sale. For example, the credit issuer may indicate to the merchant whether the consumer is creditworthy, is over his or her limit, is verified and/or has the available funds/balance to make the purchase, etc.

According to the prior art, and in the first instance, when a consumer wishes to obtain a credit product, such as a credit card or credit account, from a credit issuer, such as a bank, the consumer fills out an application, whether in hard copy or electronic form, and submits this application to the credit issuer. Once the appropriate information is received from the consumer, the credit issuer will make a decision regarding whether the applicant is eligible for credit product. If the person is, indeed, eligible, and meets the necessary requirements, the credit issuer establishes an account and provides the consumer with either the appropriate account information, or in most cases, a physical credit card for use in engaging in transactions. In addition, in order to successfully consummate the transaction, the consumer must have some preexisting relationship with some credit provider in order to facilitate any non-cash transaction, e.g., an online transaction and/or a telephone transaction, etc. Therefore, in order to engage in some non-cash purchases, the consumer must obtain credit, initiate the transaction with the merchant, and utilize the obtained credit product to consummate the transaction and receive the goods and/or services.

According to the prior art, systems have been developed to assist in facilitating a transaction between a consumer and a merchant, such as in an electronic or online environment. However, in many instances, such systems are directed primarily to consumer-to-merchant transactions, and do not provide the required functionality to allow for successful business-to-merchant or business-to-provider transactions. Many commercial transactions require additional underlying documentation and information exchange prior to (e.g., in an application process), during and after the transaction. For example, in a lease transaction, the leased property must be recorded, certain forms executed and/or identification of certain delivery data to begin the life of the lease, etc. Accordingly, such commercial transactions have normally required an extensive paper exchange between the parties in order to effectuate the transaction.

In addition, in another aspect of commercial transactions between some provider and a business entity, additional information is often required during the application process. For example, in some situations, in order to set up and/or process a credit account, line-of-credit, lease arrangement or similar credit-based relationship, the provider requires some guarantor or co-applicant data from the business entity. Prior art systems either have no basis or function in order to obtain such information, when necessary, and in some cases rely on a paper-based communication system in order to obtain this data. Therefore, there is a need for a system that facilitates the requisite data requests between the parties in order to effect the commercial transaction.

SUMMARY

Therefore, it is an object of the present invention to provide a method and system for engaging in a transaction between a business entity and a merchant that overcomes many of the drawbacks and deficiencies of the prior art. It is a further object of the present invention to provide a method and system for engaging in a transaction between a business entity and a merchant that facilitates commercial transactions between certain purchasing entities and certain providing entities. It a still further object of the present invention to provide a method and system for engaging in a transaction between a business entity and a merchant that establishes a credit-based relationship between parties, e.g., in an electronic or online environment. It is another object of the present invention to provide a method and system for engaging in a transaction between a business entity and a merchant that allows for contracting parties to effect a commercial transaction in an electronic or online environment. It is a still further object of the present invention to provide a method and system for engaging in a transaction between a business entity and a merchant that provides secure communications and facilitates transactions in an electronic, online, telephone or remote environment. It is yet another object of the present invention to provide a method and system for engaging in a transaction between a business entity and a merchant that is capable of providing "instant" credit to the business entity during the transaction process, e.g., at the point-of-sale.

In one embodiment, provided is a computer-implemented method of engaging in a transaction between a business entity and at least one merchant. The method includes: initiating a transaction by the business entity with the at least one merchant; obtaining, by the merchant, a business entity data set including at least one data field; communicating an authorization request from the merchant to a provider, the request including at least one data field from the business entity data set and at least one field from a transaction data set; establishing a credit-based relationship between the provider and the business entity based at least in part upon the at least one data field of the business entity data set and at least one data field of the transaction data set communicated thereto; communicating an authorization response from the provider to at least one of the merchant and the business entity; and engaging in the transaction between the provider and the business entity based at least in part upon the established credit-based relationship.

In another embodiment, provided is a system for engaging in a transaction between a business entity and a merchant. The system includes: computer-implementable instructions for communicating at least one data field of a business entity data set and at least one field from a transaction data set from the at least one merchant to a provider; computer-implementable instructions for establishing a credit-based relationship between the provider and the business entity based at least in part upon at least one data field of the business entity data set and at least one field of the transaction data set; and computer-implementable instructions for engaging in the transaction between the at least one merchant and the business entity based at least in part upon the established credit-based relationship.

In a still further embodiment, provided is an apparatus for engaging in a transaction between a business entity and a merchant. The apparatus includes: means for communicating at least one data field of a business entity data set and at least one field from a transaction data set from the at least one merchant to a provider; means for establishing a credit-based relationship between the provider and the business entity based at least in part upon at least one data field of the business entity data set and at least one field of the transaction data set; and means for engaging in the transaction between the at least one merchant and the business entity based at least in part upon the established credit-based relationship.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 9 is an example of another screen displayed to a user in connection with one embodiment of a method and system according to the principles of the present invention;

FIG. 10 is an example of another screen displayed to a user in connection with one embodiment of a method and system according to the principles of the present invention;

FIG. 12 is an example of another screen displayed to a user in connection with one embodiment of a method and system according to the principles of the present invention;

FIG. 14 is an example of another screen displayed to a user in connection with one embodiment of a method and system according to the principles of the present invention;

FIG. 15 is an example of another screen displayed to a user in connection with one embodiment of a method and system according to the principles of the present invention;

FIG. 19 is an example of another screen displayed to a user in connection with one embodiment of a method and system according to the principles of the present invention.

DETAILED DESCRIPTION

It is to be understood that the invention may assume various alternative variations and step sequences, except where expressly specified to the contrary. It is also to be understood that the specific devices and processes illustrated in the attached drawings, and described in the following specification, are simply exemplary embodiments of the invention.

The present invention is directed to a method and system 10 for use in commerce, e.g., commercial transactions, by and between various entities. For example, in one embodiment, the commercial transaction is between a business entity B and a provider P. However, this business entity B may be a consumer, a proprietorship, a partnership, a company, a corporation, an S corporation, a Limited Liability Company, a Limited Liability Partnership, a non-profit business entity, a governmental entity, a municipal entity, a public entity or any combination thereof. Similarly, the provider may be a merchant, a credit issuer, a lessor, a seller, a financial institution or any combination thereof. Still further, a variety of commercial transactions, business engagements and credit-based relationships are contemplated within the context of the present invention, including a credit account, a credit product, a debit account, a debit product, a line-of-credit, a loan, a lease arrangement or any combination thereof.

While not limiting, the method and system 10 of the present invention is useful in many fields, applications and environments. In one preferred embodiment, the method and system 10 is implemented in a network environment N, which includes remotely situated parties. However, the method and system 10 are equally useful and applicable in an electronic or online environment, in a telephone system and/or in some other remote/communication-based environment.

Accordingly, the presently-invented method and system 10 is useful in connection with a variety of parties desirous of entering into a credit-based relationship. It should be further noted that the system 10 is equally useful in connection with debit issuers (financial institutions) and debit-based transactions, such that instances herein directed to "credit products", "credit issuers" and "credit-based relationships" are interchangeable with "debit products", "debit issuers" and "debit-based relationships". Still further, and as used throughout the following specification, the "credit issuer" may be a credit card company, a payment services system, a payment company and/or an electronic payment company, etc. In general, it is the credit issuer or provider that supplies the credit product, credit account or otherwise engages in a credit-based relationship with a consumer/business entity, which credit-based relationship is used in a credit-based transaction, whether online (in the network environment N), over the telephone or at a physical point-of-sale.

Figure 1:
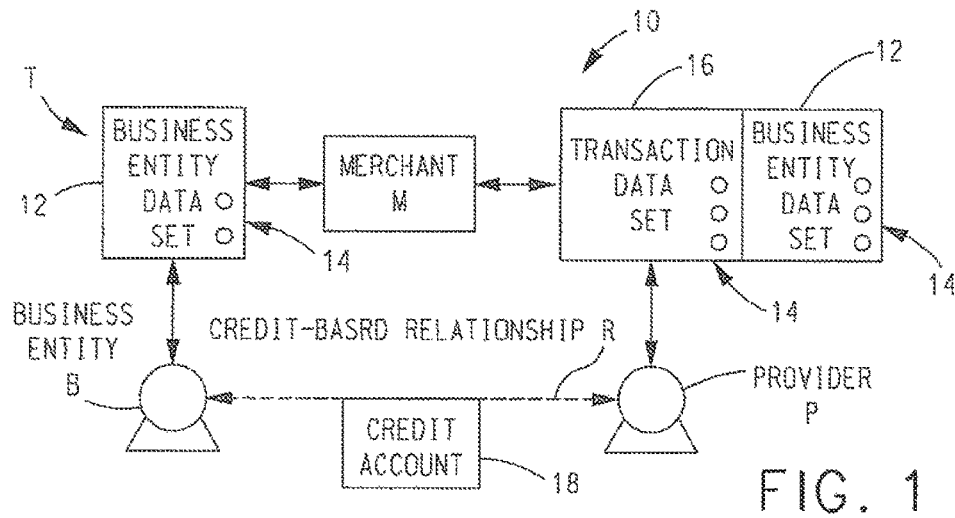
FIG. 1 is a schematic view of one embodiment of a method and system according to the principles of the present invention.
Figure 2:
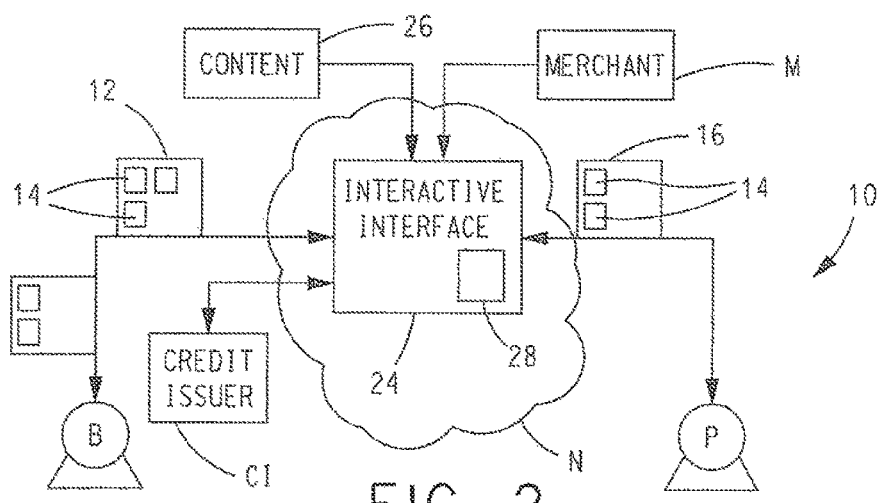
FIG. 2 is a schematic view of another embodiment of a method and system according to the principles of the present invention.
Figure 3:
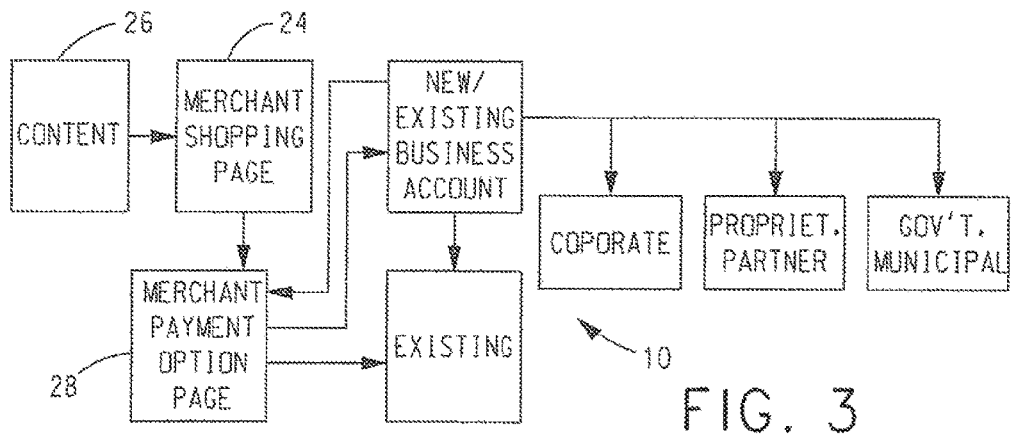
FIG. 3 is a flow diagram of a still further embodiment of a method and system according to the principles of the present invention.
Figure 4:
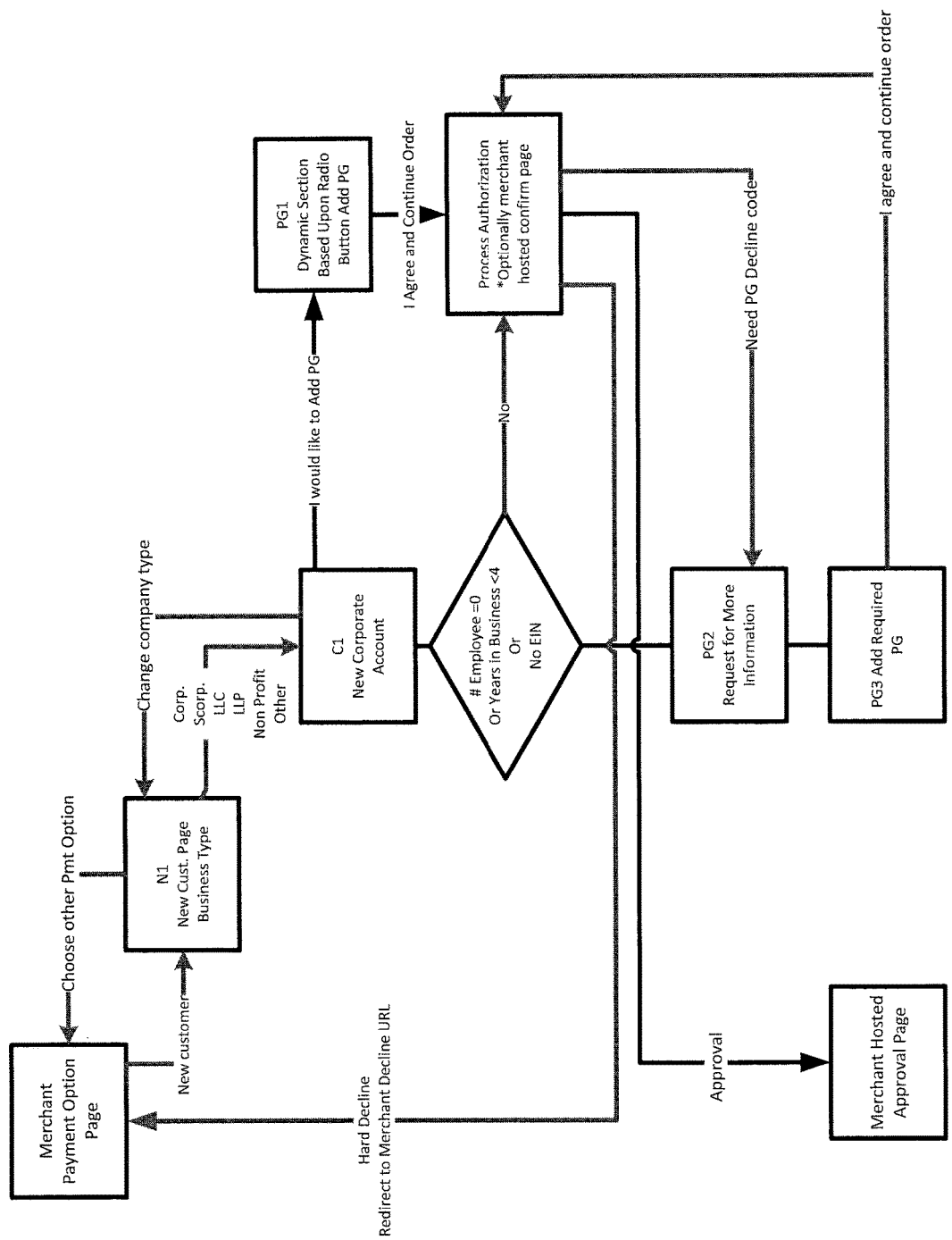
FIG. 4 is a flow diagram of another embodiment of a method and system according to the principles of the present invention.

Various embodiments of the presently-invented system 10 are illustrated in schematic form in FIGS. 1, 2, 5 and 6 and in process-flow form in FIGS. 3 and 4. Exemplary and non-limiting screenshots and depictions are provided in FIGS. 7-19, and these figures illustrate certain steps, features, functions and aspects of various non-limiting embodiments of the method and system 10. Other data flow and decision-making processes are contemplated within the context of the present application, as are other forms, formats, layouts and screenshots of certain aspects of the method and system 10.

Accordingly, in one non-limiting embodiment, the present invention is directed to a computer-implemented method and system 10 for engaging in a transaction T between a merchant M and a business entity B based upon a credit-based relationship established between the business entity B and a provider P. As illustrated in FIG. 1, and in a first step, a business entity data set 12 is obtained by the merchant M at the point-of-sale, and this data set 12 includes at least one, and typically multiple, data fields 14. Similarly, a transaction data set 16 is generated, and this data set 16 also includes one or more data fields 14. After communicating these data sets 12, 16, to the provider P, a credit-based relationship R is established between a provider P and a business entity B based at least partially upon one or more data fields 14 of the business entity data set 12 and/or the transaction data set 16. Finally, the transaction T is facilitated, i.e., the merchant M and the business entity B engage in the transaction T, based at least partially upon the established credit-based relationship R. In this manner, a successful commercial transaction occurs based upon the established credit-based relationship R, and as discussed, this credit-based relationship R may be a credit relationship, a line-of-credit, a loan and/or a lease arrangement, etc. Further, the system 10 provides this "instant" credit process at the point-of-sale, with the initial business entity B/provider P relationship established during the transaction T.

In a further embodiment, and as illustrated in FIG. 2, the transaction T is an electronic or online transaction conducted in a network environment N. Accordingly, the system 10 includes the appropriate subsystems and communication platforms to obtain the data sets 12, 16, establish the credit-based relationship R and engage in the transaction T. Still further, this credit-based relationship R may be established prior to, during or after: initiating a subsequent transaction T; commencing a subsequent transaction T; initiating a payment process directed to the transaction T; completing the transaction T, or any combination thereof. When this credit-based relationship R is established, it is based upon the new or some existing status of the relationship between the provider P and the business entity B.

In a further embodiment, and as seen in FIG. 1, the credit-based relationship R may be in the form of a credit account 18 established with a provider P (which may be in the form of a credit issuer CI). This credit account 18 is established based at least partially upon the data fields 14 in the obtained or supplied data sets 12, 16. After the credit account 18 is established, it may then be used in subsequent transactions T with the provider P.

Part of establishing the credit account 18 or credit-based relationship R includes the application process, the transaction T process and the consummation of the transaction T, e.g., the payment or settlement process. During any of these steps or processes of the system 10, additional acts may be performed. For example, the business entity B may be identified or verified, the business entity B may be contacted, the business entity B may be processed and/or the business entity B may be authorized, etc. In addition, any of these sub-processes or acts may occur prior to finalizing or completing the transaction T.

In another embodiment, and in order to facilitate additional transactions or communications between the provider P and the business entity B, a username 20 and password 22 can be established. In this regard, the username 20 and password 22 must be used by the authorized business entity B prior to successfully engaging in a subsequent transaction T using the established credit account 18. Further, the username 20 and/or password 22 may be assigned, predetermined, selected, user-selected and/or modifiable, etc. For example, if the provider P and the business entity B have a pre-existing relationship outside of the system 10, it is envisioned that the username 20 and password 22 associated with this other relationship may be used in connection with the system 10 for authorization purposes.

In another embodiment, a system 10 includes an interactive interface 24 that is accessible by the business entity B and facilitates communication between the merchant M, the provider P, the business entity B, the credit issuer CI, etc. This interactive interface 24 may be displayed to the business entity B as a website page in an online or network environment N. For example, the website page may include content 26, which has been provided by the merchant M, the provider P, the business entity B, the credit issuer CI and/or a third party, etc. Still further, and in one embodiment, the interactive interface 24 is provided as a website page that is a merchant page, a provider page, a credit issuer page, a third-party page, a generated page, a secured page, a redirected page, a referenced page and/or a formatted page, etc. Accordingly, the content 26 may be input to and/or provided by a variety of users within the system 10. For example, when a secured environment is required, in some instances the content 26 is provided from a third-party, secure source to the page of the merchant M, such as a merchant's interactive website. In addition, this content 26 may be provided on a website page that is hosted by or controlled by some third party, provider P and/or credit issuer CI, etc., which allows that party to control the content 26.

A variety of different forms, format and makeup of content 26 may be provided to or displayed on the interactive interface 24. For example, the displayed content 26 may be directed to the merchant M, the provider P, the business entity B, the credit issuer CI, the credit-based relationship R, the credit account 18, a credit product, a debit account, a debit product, a line-of-credit, a loan, a lease arrangement, terms, conditions, benefits, options, incentives, transactional information (transaction data set 16), business entity information, provider information, credit information, co-applicant information, guarantor information and/or advertising information, etc. This demonstrates that the interactive interface 24 may be used as the platform to receive, transmit and/or display a portion of or all of the content 26 required to establish the credit-based relationship R and/or engage in or effect the transaction T.

As discussed hereinafter, this content 26 may be displayed to the user in a variety of forms. For example, the content 26 may be in the form of a web page, a pop-up box, a window, a banner, a separate portion of the web page and/or a specified area of the web page (e.g., within a frame), etc. Accordingly, in this non-limiting embodiment, the content 26 is displayed and used in connection with the interactive interface 24 in the network environment N, such as the Internet and/or the World Wide Web, etc.

In another non-limiting embodiment, the interactive interface 24 is in the form of or includes a payment interface 28. This payment interface 28 includes one or more selectable portions, e.g., drop-down menus, buttons and/or radio-buttons, etc., for initiating the process of establishing the credit account 18. In addition, within this payment interface 28, the user may initiate the process of logging into or associating themselves with an existing credit account 18 and/or displaying certain terms, conditions, benefits, options and/or incentives, etc. directed to this credit account 18.

Dependent upon whether the business entity B and/or the provider P is a new or existing party to the relationship, various data fields 14 may be utilized. For example, the data fields 14 of the business entity data set 12 may be business type, number of employees, time period in business, business identity data, business-related data, legal name of business, address, Federal Employee Identification Number, contact data, contact name, phone number, e-mail address, authorization data, guarantor data, consent data, contact position in business, contact date-of-birth, contact social security number, billing data, shipping data, verification data, agreement data, application data, applicant data and/or co-applicant data, etc. In one embodiment, and based upon at least one of these data fields 14 of the business entity data set 12, the system 10 may be capable of pausing the transaction T, terminating the transaction T, authorizing the transaction T, verifying the business entity B (or user), contacting the business entity B (or user), processing the business entity B (or user), requesting additional data from the business entity B (or user) and/or initiating an interview with the business entity B (or user), etc.

Accordingly, based upon the information and data supplied by the business entity B, the system 10 is capable of engaging in a variety of steps to establish an account, establish the credit-based relationship R, and verify, authorize or otherwise process the transaction T and/or the business entity B. As discussed above, the business entity B may be required to supply a username 20 and password 22 when the business entity B is a returning or existing customer of the provider P (or credit issuer CI).

Similar to the data fields 14 of the business entity data set 12, a variety of data fields 14 may also be utilized in connection with the transaction data set 16. For example, the data fields 14 of the provider data set 16 may include provider type, provider data, provider identity, merchant type, merchant data, merchant identity, transaction data, goods data, services data, credit issuer data, credit-based relationship data, credit product data, application data, line-of-credit data, loan data, lease data, terms data, conditions data, benefits data, options data and/or incentives data, etc. In addition, some of this data may already be part of or controlled by a third-party credit issuer CI or similar processing system. For example, in the instance when the provider P and the credit issuer CI are different parties, some or a portion of the provider data set 16 would be part of or controlled by the third-party credit issuer CI. As discussed above, the provider P may be a credit issuer CI, a lessor, a seller and/or a financial institution, etc. Similarly, the merchant M may be a lessor, but utilize the system 10 to establish the relationship, authorize or verify the business entity B, etc.

In another aspect and non-limiting embodiment, a system 10 is capable of effectuating or engaging in one or more aspects of the transaction T or credit-based relationship R between the business entity B and the provider P. In particular, the system 10 may provide for communication between the merchant M, the business entity B and the provider P, such as in the form of an electronic communication and/or e-mail, etc. In addition, the system 10 may include a digital signature process for verifying and authorizing various steps in the transaction T or credit-based relationship R. Still further, the system 10 may include the appropriate forms and/or documents in order to effectuate the transaction T or the credit-based relationship R between the parties. For example, the system 10 may provide the appropriate forms and documents by and between the merchant, M, the business entity B and the provider P in a variety of established relationships in order to effect the relationship. For example, in a lease transaction, the system 10 may include the appropriate documents and communications in order to record the leased property, execute the necessary documents and/or identify the delivery data or life of lease, etc. Accordingly, various prior "paper steps" may be implemented or utilized in an electronic form and communication in the presently-invented system 10.

In one embodiment, and as illustrated in FIG. 3, the content 26 includes banners, "learn more" data, pop-up content and/or terms and conditions data, etc., which is transmitted to or referenced by the interactive interface 24, which, in this embodiment, is a merchant shopping page in a network environment N. During the transaction T, the business entity B is transferred to the payment interface 28, which, in this embodiment, is the merchant payment option page. It is on this merchant payment option page that the business entity B can choose from a variety of payment methods, including the method embodied in the system 10 of the present invention. If the business entity B is a pre-existing customer of the provider P (the merchant), and as discussed above, it is envisioned that the same login data and pre-existing account may be used. However, if the business entity B is a new customer of provider P, a new credit account 18 is established, and this credit account 18 may be in a variety of forms.

As seen in FIG. 3, the credit account 18 may be a new corporate account, where the application is of a set form and requires specifically identified data fields 14. Another type of credit account 18 would be a new proprietorship or partnership account, and often the application in such an account will require that the owner be a guarantor of the transaction T or credit-based relationship R. Yet another type of credit account 18 would be a new government or school (municipal) account, which also requires a predetermined set of data fields 14. However, as such accounts cannot have personal guarantors, such information would not be required.

Yet another embodiment of the system 10 is illustrated in FIG. 4. As discussed above, the business entity B commences the transaction T and enters the merchant payment option page, which is the payment interface 28. Within this interface 28, the customer is directed to the "new" customer page, and may, at this point, choose another payment option. However, if the customer or business entity B wishes to utilize the method and system 10, he or she must input the type of business. As discussed hereinafter, the "business type" may be chosen from a drop-down box and could also be modified by the user.

If the credit account 18 to be established is a new corporate account, it may be added to the system 10 (whether as part of the provider P system and/or a credit issuer CI system). After inputting the appropriate data, the customer must agree to be bound by the terms and conditions of the credit account 18. At this point, the system 10 will authorize the application and either decline the application, authorize and establish the credit account 18 or, in some cases, request additional information.

In some instances, such as if the number of employees is zero, the years in business is less than a certain amount or the applicant has no tax identification number, the system 10 may also request additional information or data from the user. In such cases, and in order to establish the credit account 18, the system 10 will also require a personal guarantor that must also agree to be bound by the terms and conditions of the credit-based relationship R.

The results of this application process for "new" customers may be provided directly to the user or customer, or alternatively, through the payment interface 28. In addition, if the system 10 opts to "decline" the applicant, this information can be provided through the payment interface 28. When the applicant is approved, the applicant may be redirected or moved to an approval page 30, such as a merchant-hosted approval page. Of course, any entity may host or serve the content associated with this approval page 30. In this manner, the credit-based relationship R is established between the provider P and the business entity B.

Figure 5:
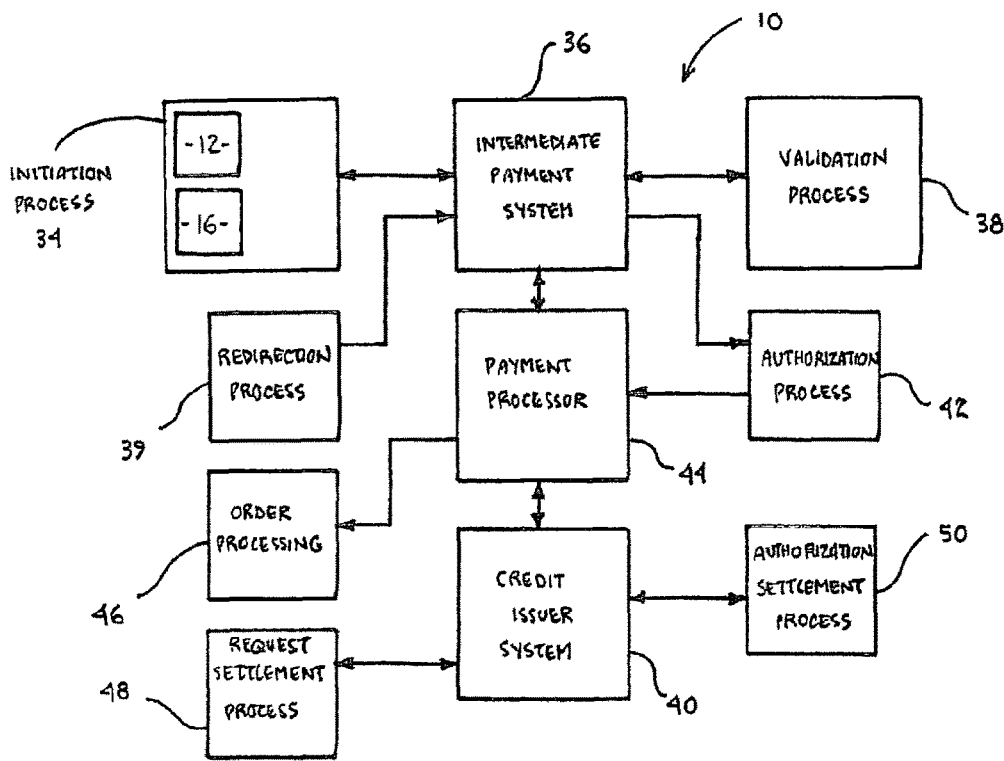
FIG. 5 is a schematic view of one embodiment of a system according to the principles of the present invention.

FIG. 5 illustrates a further example and non-limiting embodiment of the presently-invented system 10. In particular, the system 10 illustrated in FIG. 5 is for "new" customers or first-time business entities B. In this example, the business entity data set 12, as well as the transaction data set 16, is transmitted from the interactive interface 24 in an initiation process 34. In particular, the business entity data set 12 and transaction data set 16 is transmitted to an intermediate payment system 36. Further, in this example, the business entity data set 12 includes an e-mail address, business name, business address, contact, shipping information, business phone and/or optional purchase order number, etc. In addition, the transaction data set 16 includes the purchase amount, shipping costs, product type and channel of trade.

The intermediate payment system 36 validates the business entity B and transaction T in a validation process 38, and returns a URL for a customer redirect. Next, in a redirection process 39, the merchant or provider P redirects the customer to a merchant-branded page of the intermediate payment system 36 and/or a credit issuer system 40. Next, certain authentication information, e.g., date-of-birth and/or last four digits of the user's social security number, etc., is captured in the transaction T or credit-based relationship R and processed in an authorization process 42. In this embodiment, the authorization process 42 occurs in connection with a payment processor 44.

In this embodiment, and upon receiving a successful authorization from the payment processor 44, the merchant continues processing the order or transaction T in an order processing step 46. After the transaction T, the merchant or provider P requests and records certain authorization responses for settlement processing in a request settlement process 48. In this embodiment, the settlement processing occurs through the credit issuer system 40, which is capable of handling authorization, underwriting and customer billing. Finally, the credit issuer system 40 returns some status request response, which may include an account number of the credit account 18, as well as some authorization code for settlement processing, all of which is provided in an authorization settlement process 50.

As shown, the customer or business entity B has established and used the new credit-based relationship R for successfully engaging in an immediate transaction T. This is further augmented by the communications that occur between the intermediate payment system 36, the payment processor 44 and the credit issuer system 40.

Figure 6:
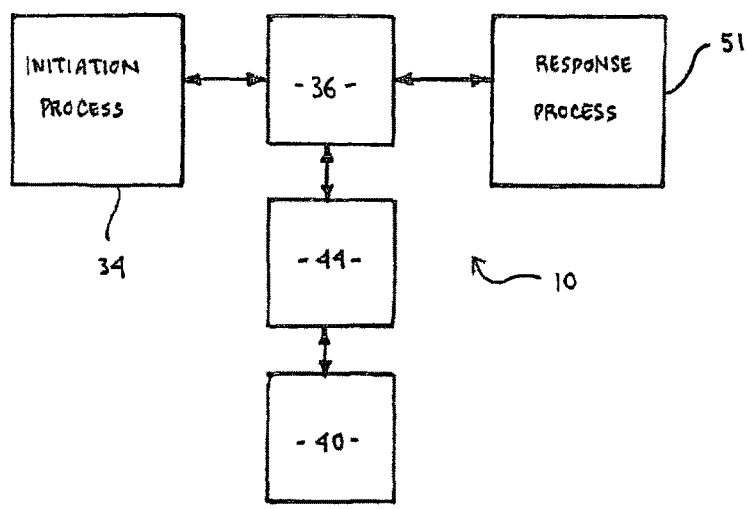
FIG. 6 is a schematic view of another embodiment of a system according to the principles of the present invention.

FIG. 6 illustrates a customer or business entity B in a "returning" situation. In such a situation, and in the initiation process 34, the business entity data set 12 includes an account number, a username 20, a password 22, a bill-to name/address, a ship-to name/address, an e-mail address, a telephone number and an internet protocol address. Similarly, the transaction data set 16 includes the purchase amount, the shipping cost, the product type and the channel. This information is provided through the intermediate payment processor 36. Since the customer is a "returning" customer, the intermediate payment system 36, whether or not in immediate communication with the payment processor 44 and/or the credit issuer system 40, transmits a standard response code or authorization control code back to the merchant M in a response process 51.

Figure 7:
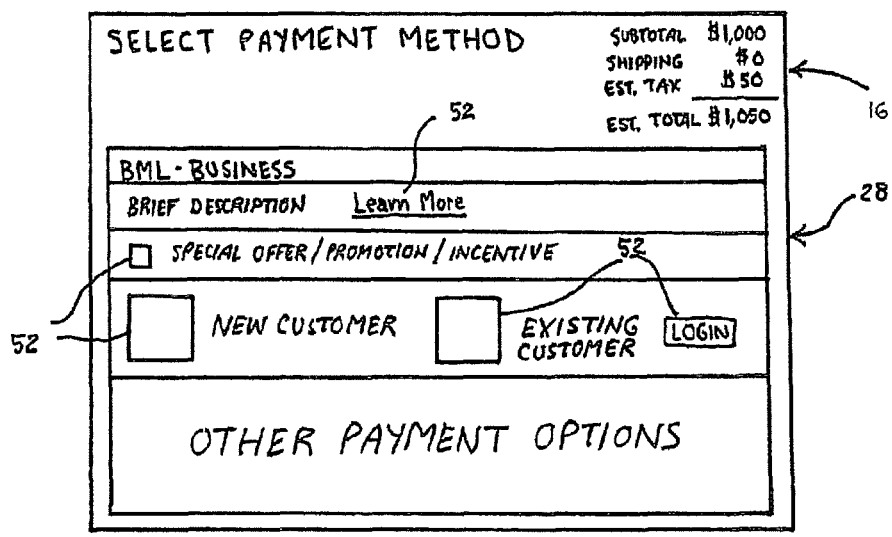
FIG. 7 is an example of a screen displayed to a user in connection with one embodiment of a method and system according to the principles of the present invention.

FIGS. 7-19 illustrate a variety of example screenshots that may be used during the establishment and transactional phases of the credit-based relationship R between the provider P and the business entity B. FIG. 7 is an exemplary payment interface 28, which includes a variety of selectable portions 52, such as in the form of check boxes, drop-down menus, radio buttons, links and/or pop-ups, etc. On this example screenshot, certain transactional data, e.g., data in the transaction data set 16, is provided, and the user may select to be included in some special offer, promotion or incentive. In addition, on this payment interface 28, the user selects whether he or she is a new customer or an existing customer. If the user is an existing customer, he or she would actuate the selectable portion 52 in the form of a "login" button. However, if the user is a new customer, he or she would actuate a selectable portion 52 that would lead to the screenshot illustrated in FIG. 8.

Figure 8:
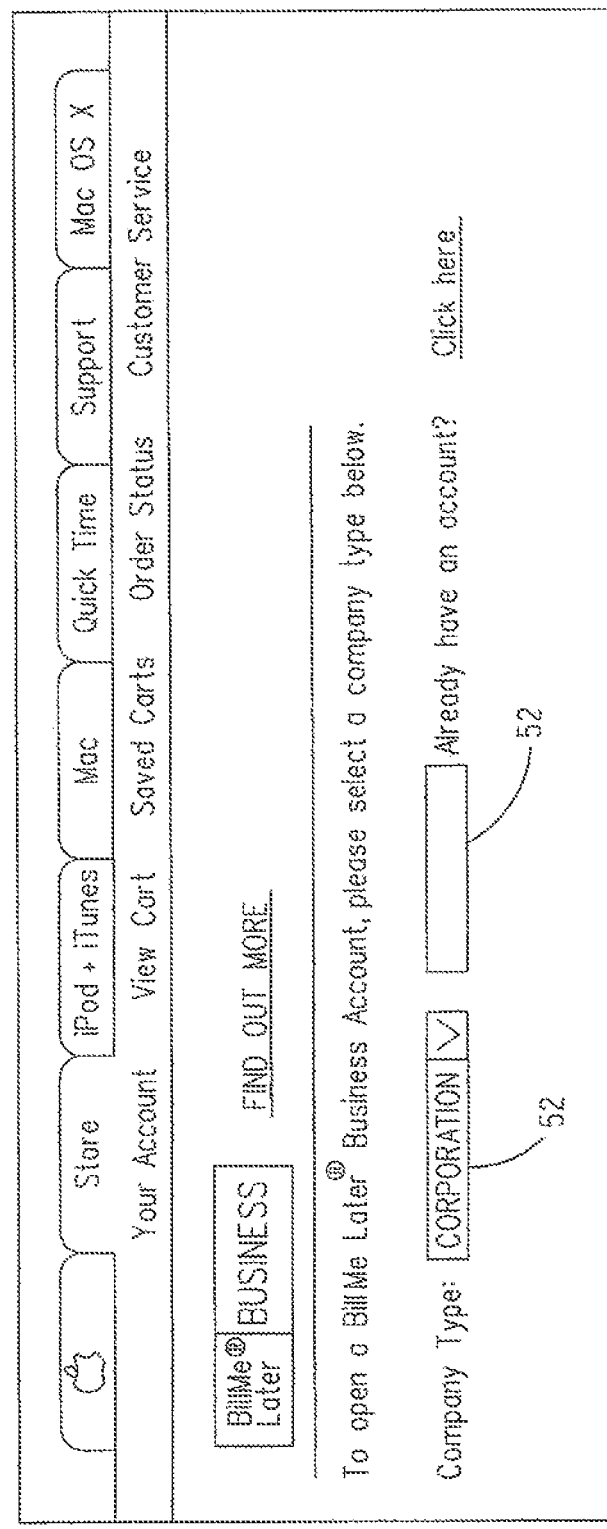
FIG. 8 is an example of another screen displayed to a user in connection with one embodiment of a method and system according to the principles of the present invention.

As seen in FIG. 8, the user must first identify the company type by using the selectable portion 52 in the form of a drop-down menu of varying company types. As discussed and in this embodiment, the company type may be a corporation, a partnership, a sole proprietorship, an S corporation, an LLC, an LLP, a non-profit entity, a governmental entity, a school and/or a municipal entity, etc.

Figure 9:
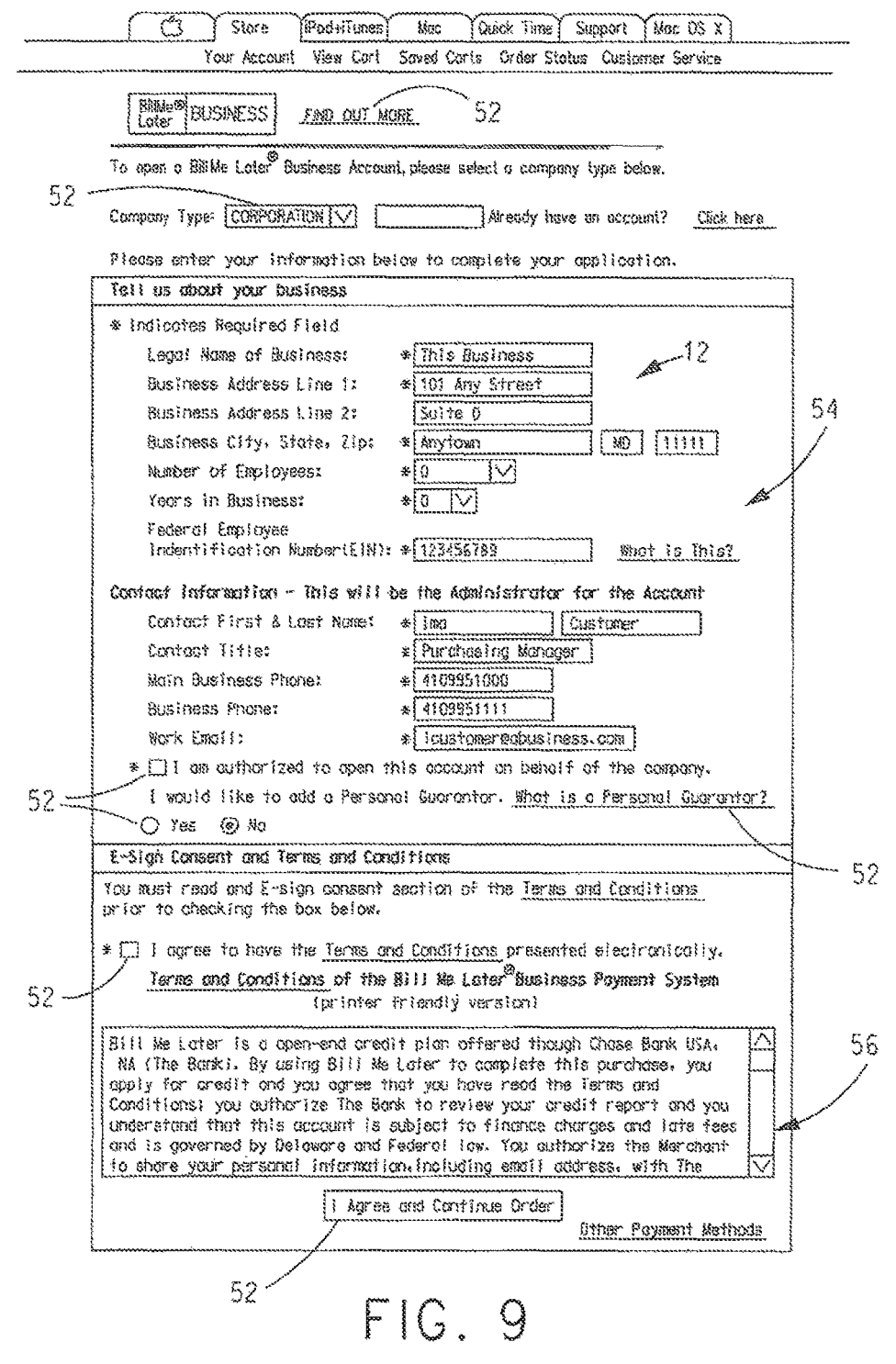

As seen in FIG. 9, if the person indicates that they represent a corporation, an application 54 is displayed. In this embodiment, and in the application, the business entity data set 12 includes the legal name of the business, business address, number of employees, years in business, Federal Employee Identification Number, contact name, contact title, main business phone, business phone, work e-mail and other selectable portions 52. In particular, there are certain selectable portions 52 that allow the user to link to an information pop-up or box explaining the data field or required information. As seen in FIG. 9, the user may indicate whether or not he or she is authorized to open the account on behalf of the company, and whether or not a personal guarantor should be utilized. In the example of FIG. 9, the default is that no personal guarantor is required.

In order to establish the credit-based relationship R, and in this non-limiting embodiment, the user must review the terms and conditions underlying the credit account 18, and indicate that they agree to these terms and conditions. Further, the terms and conditions of the credit account 18 may be provided to the user in a terms and conditions box 56, which is associated with a selectable portion 52 in the form of an agreement to these terms and conditions. Still further, another selectable portion 52 leads the user to a printer-friendly version of the terms and conditions underlying the credit account 18.

Figure 10:
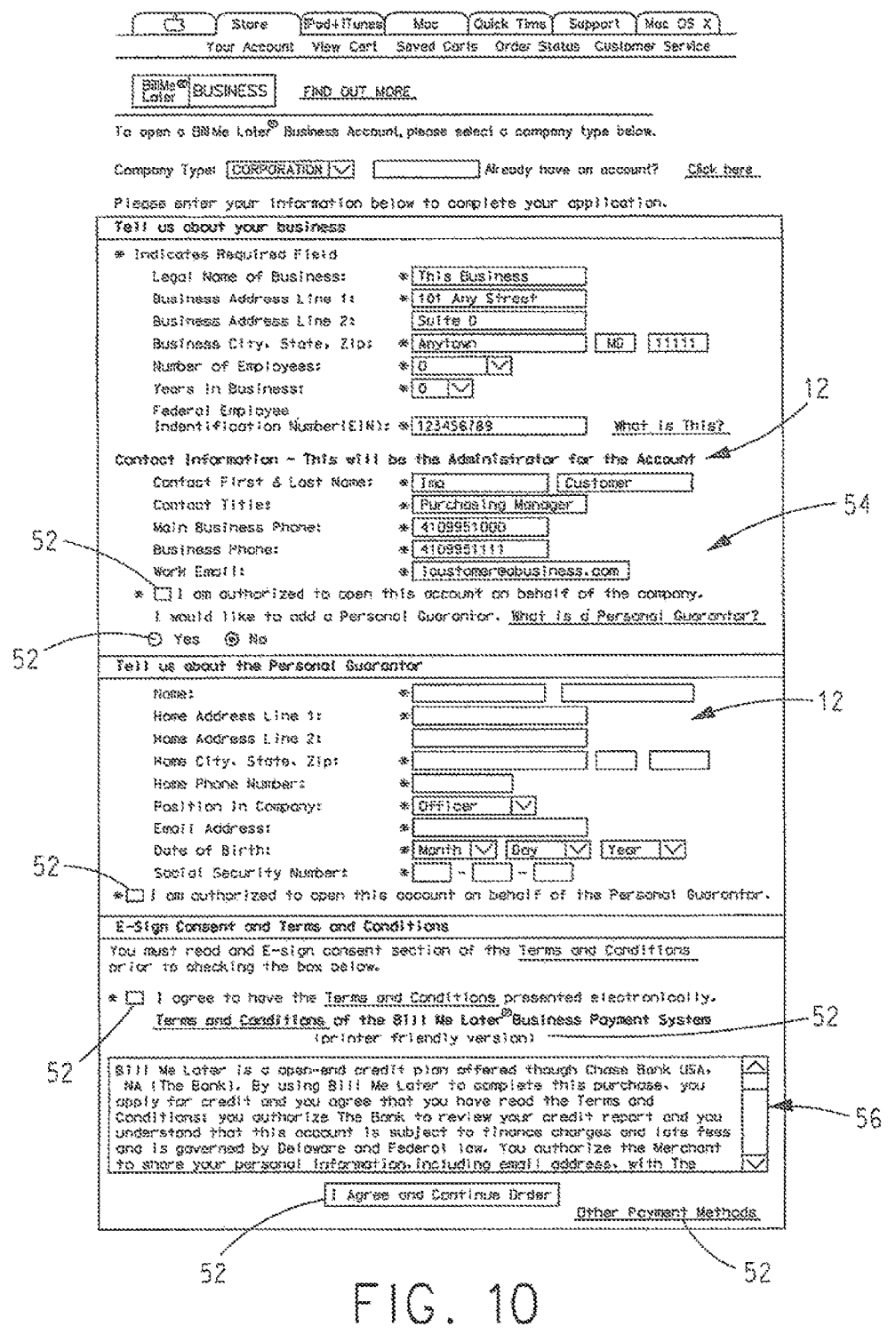

FIG. 10 illustrates an application 54 for a credit account 18 where the user has indicated that a personal guarantor is to be used. In this manner, the business entity data set 12 further includes the guarantor name, address, phone number, position in the company, e-mail address, date-of-birth and social security number. In addition, the guarantor must indicate that they are authorized to open the account on behalf of the personal guarantor. As before, an electronic signature is required and some indication that the terms and conditions box 56 has been reviewed and the terms and conditions agreed to.

Figure 11:
FIG. 11 is an example of another screen displayed to a user in connection with one embodiment of a method and system according to the principles of the present invention.
Figure 13:
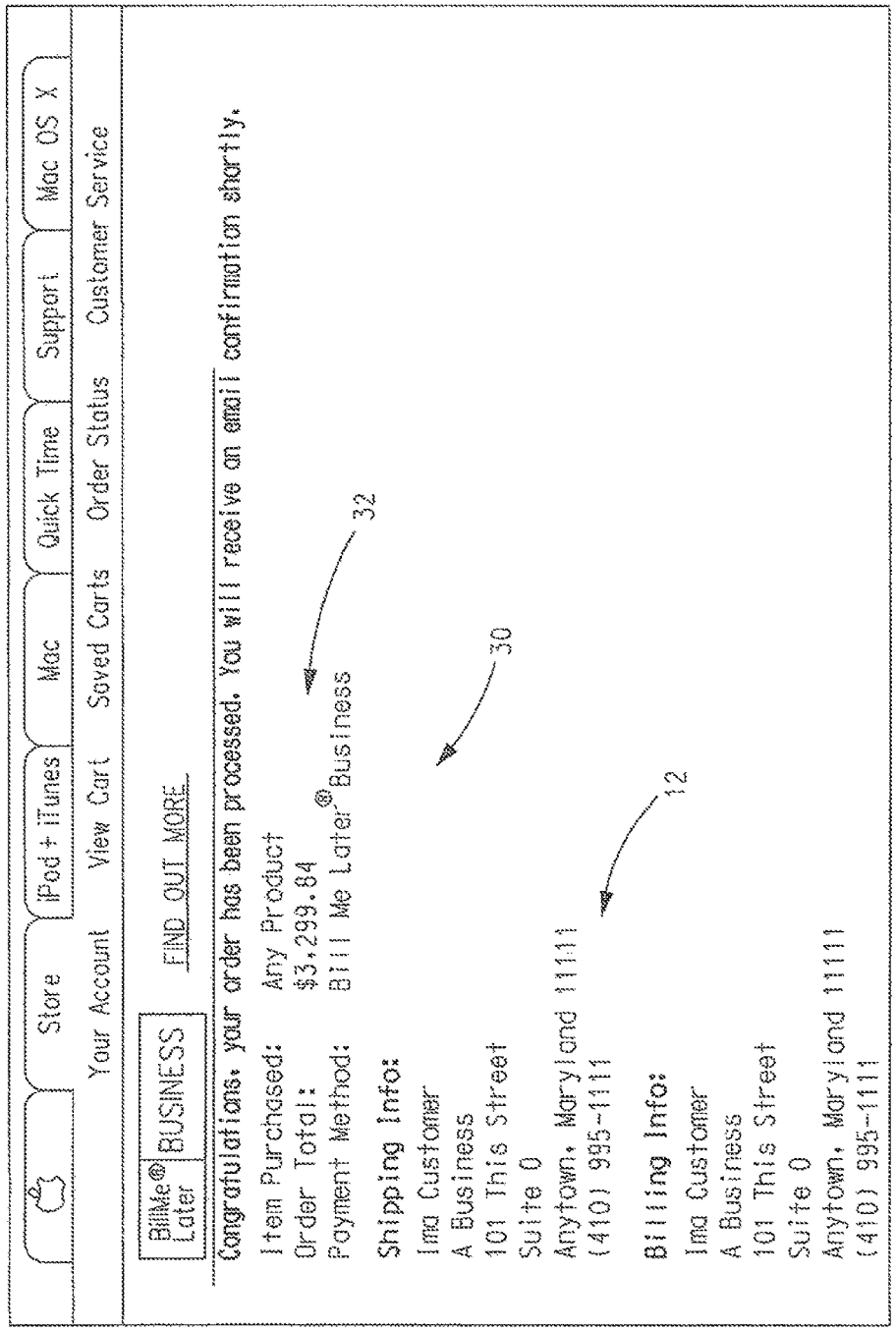
FIG. 13 is an example of another screen displayed to a user in connection with one embodiment of a method and system according to the principles of the present invention.

As discussed above, and in some instances, a personal guarantor is required. FIG. 11 illustrates a personal guarantor page 58 that explains what a personal guarantor is and why the system 10 is requesting that one be utilized at this time. For example, there may be an insufficient credit history for the business entity B, a specified business designation, a deficient number of years in business or a deficient number of employees. In essence, the personal guarantor page 58 explains to the user why a guarantor is required.

Figure 12:
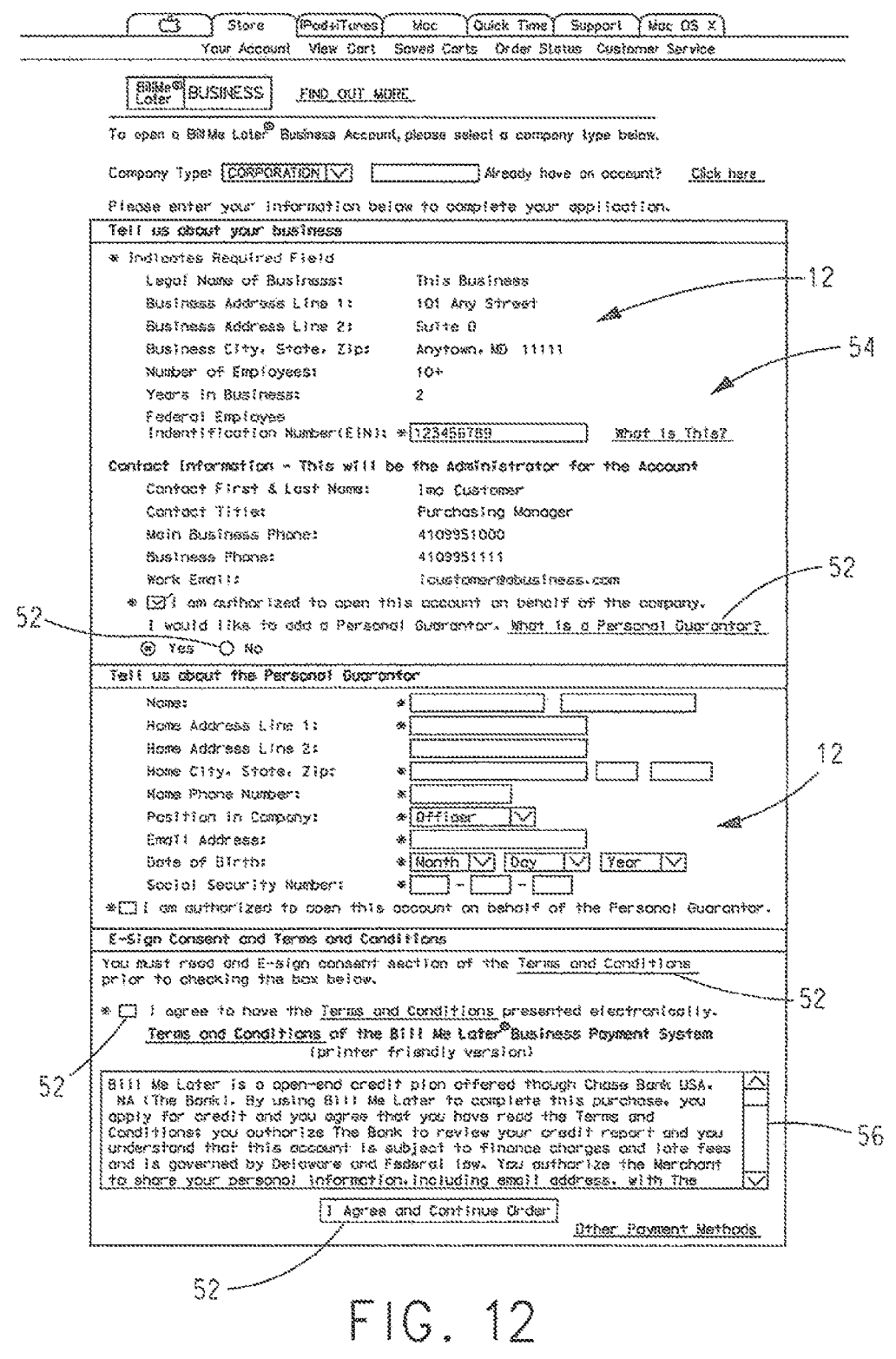

FIG. 12 illustrates the application after the personal guarantor has been required as discussed in connection with FIG. 11. Most of the data fields 14 of the business entity data set 12 have been previously entered into the application 54, and now the personal guarantor data is required as discussed above. In this example, the position in the company may include a principal, an officer, the chief executive officer, the chief financial officer, the president and/or the partner, etc. In this case, the information regarding the personal guarantor is required in order to establish the credit-based relationship R or otherwise engage in a transaction T.

If the user is successful, a merchant-hosted approval page 30 is displayed. See FIG. 13. In addition, this approval page 30 indicates to the user that the order or transaction T has been processed. In addition, certain of the business entity data set 12 and/or the transaction data set 16 is provided to the user, such as the purchased item, the order total, the payment method, the shipping information and/or the billing information.

Figure 14:
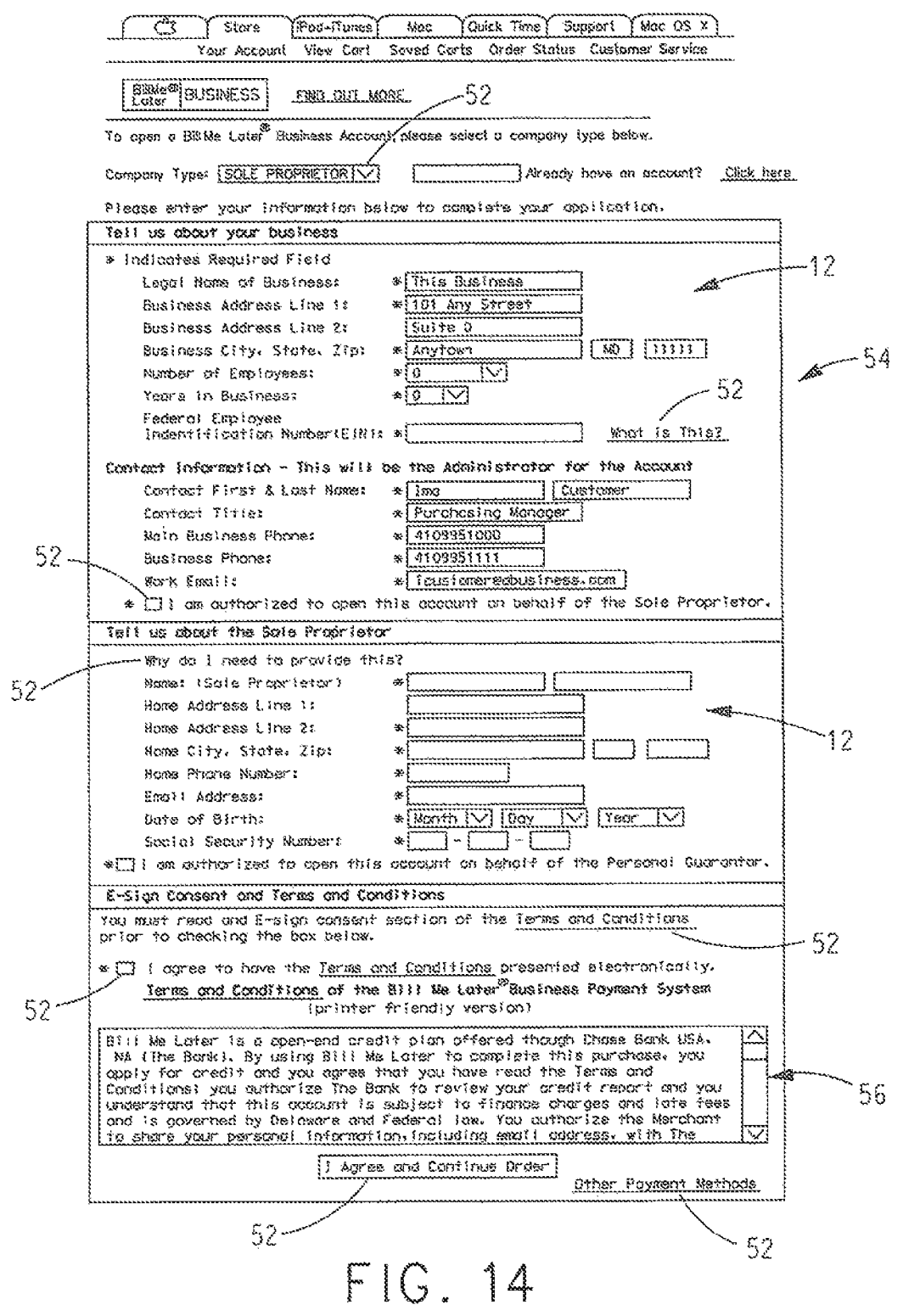

FIG. 14 illustrates an example of an application for a new proprietorship or partnership credit account 18. In this application, the user must indicate whether or not they are authorized to open the credit account 18 on behalf of the sole proprietor. In addition, information regarding the sole proprietor is required, including the name, address, phone number, e-mail address, date-of-birth and social security number. As discussed above, the terms and conditions box 56 is presented and requires an electronic signature in order to establish the credit account 18.

Figure 15:
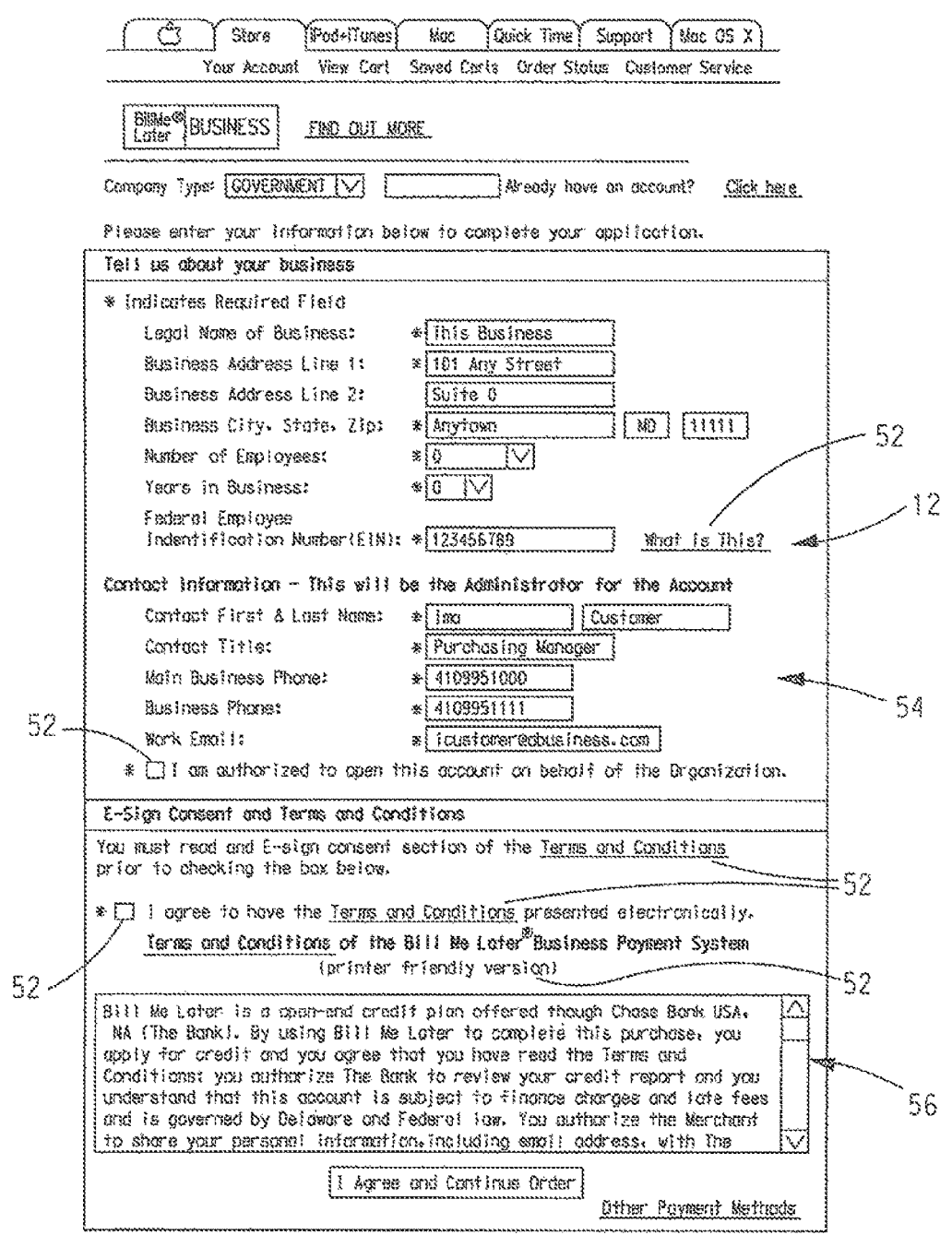

FIG. 15 illustrates an application 54 that may be used in connection with a new government, school or municipal account. In this application, various business data and contact information is required, as well as some indication that the user is authorized to open the account on behalf of the organization. As discussed above, the electronic signature indication and terms and conditions box 56 is also included.

Figure 16:
FIG. 16 is an example of another screen displayed to a user in connection with one embodiment of a method and system according to the principles of the present invention.
Figure 17:
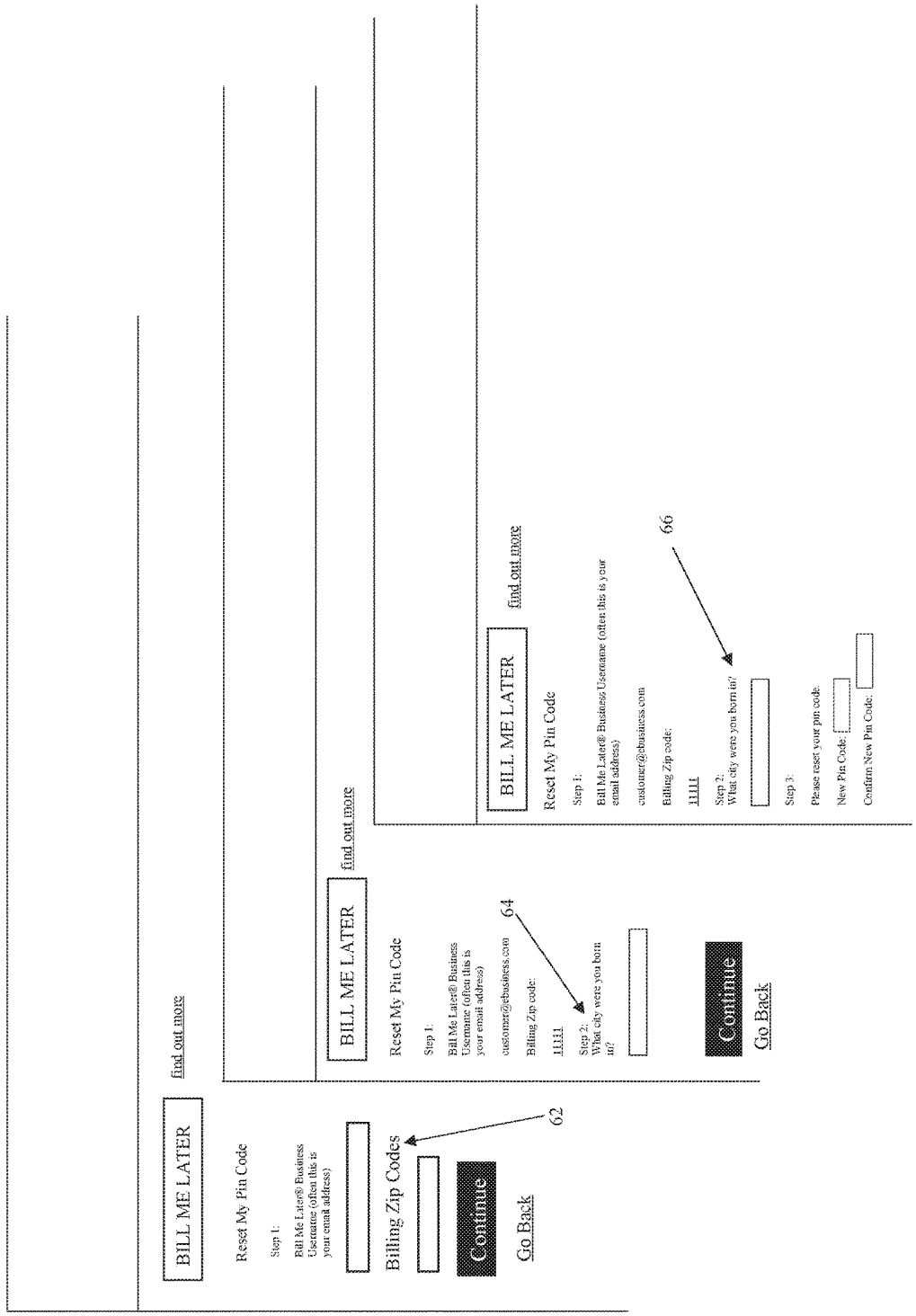
FIG. 17 is an example of another screen displayed to a user in connection with one embodiment of a method and system according to the principles of the present invention.
Figure 18:
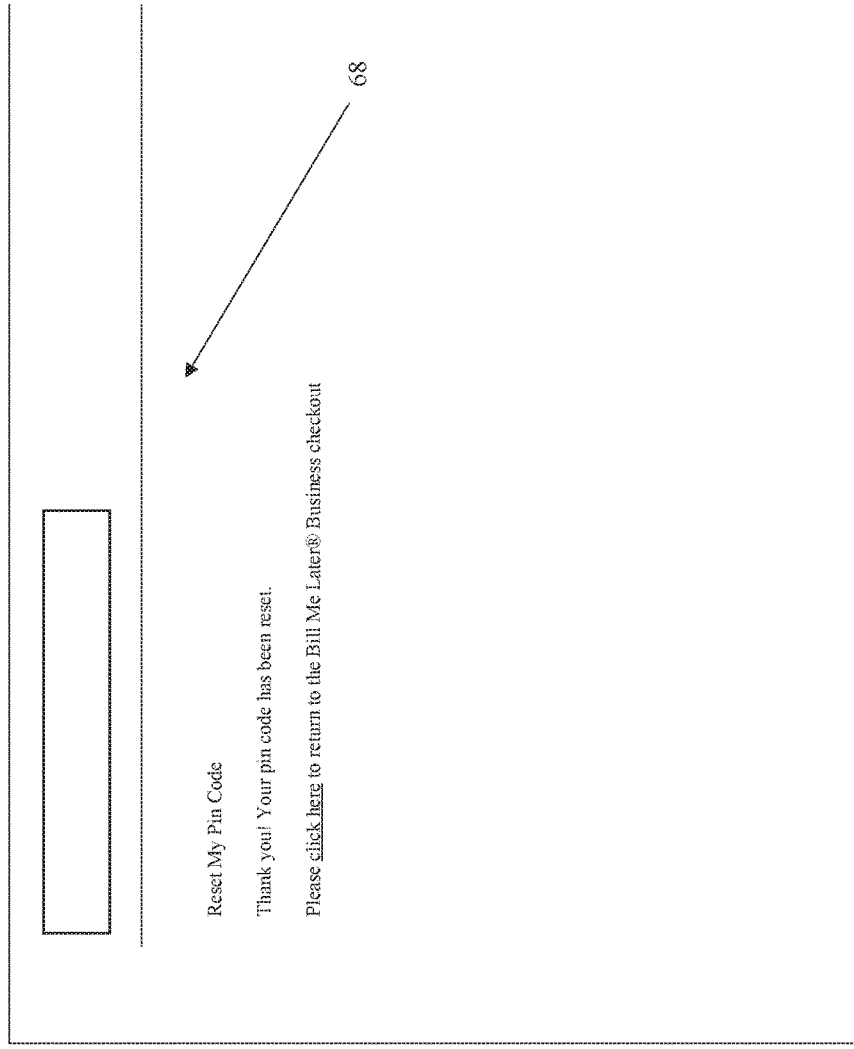
FIG. 18 is an example of another screen displayed to a user in connection with one embodiment of a method and system according to the principles of the present invention.

FIG. 16 is a screenshot of a login page 60 that would be used in connection with an existing customer or business entity B. On this page 60, the business entity B enters the username 20 and password 22 in order to continue with the transaction T. If the user forgot his or her password 22, it may be reset using a series of screenshots illustrated in FIG. 17. In this figure, in a first step 62, the user enters the username 20 as well as the billing zip code. In a second step 64, the user must enter in what city they were born. Finally, in a third step 66, the user enters the new password 22 and confirms this new password 22 with the system 10. If successful, a reset password page 68 is displayed to the user, such as in the form of the screenshot of FIG. 18.

Figure 19:
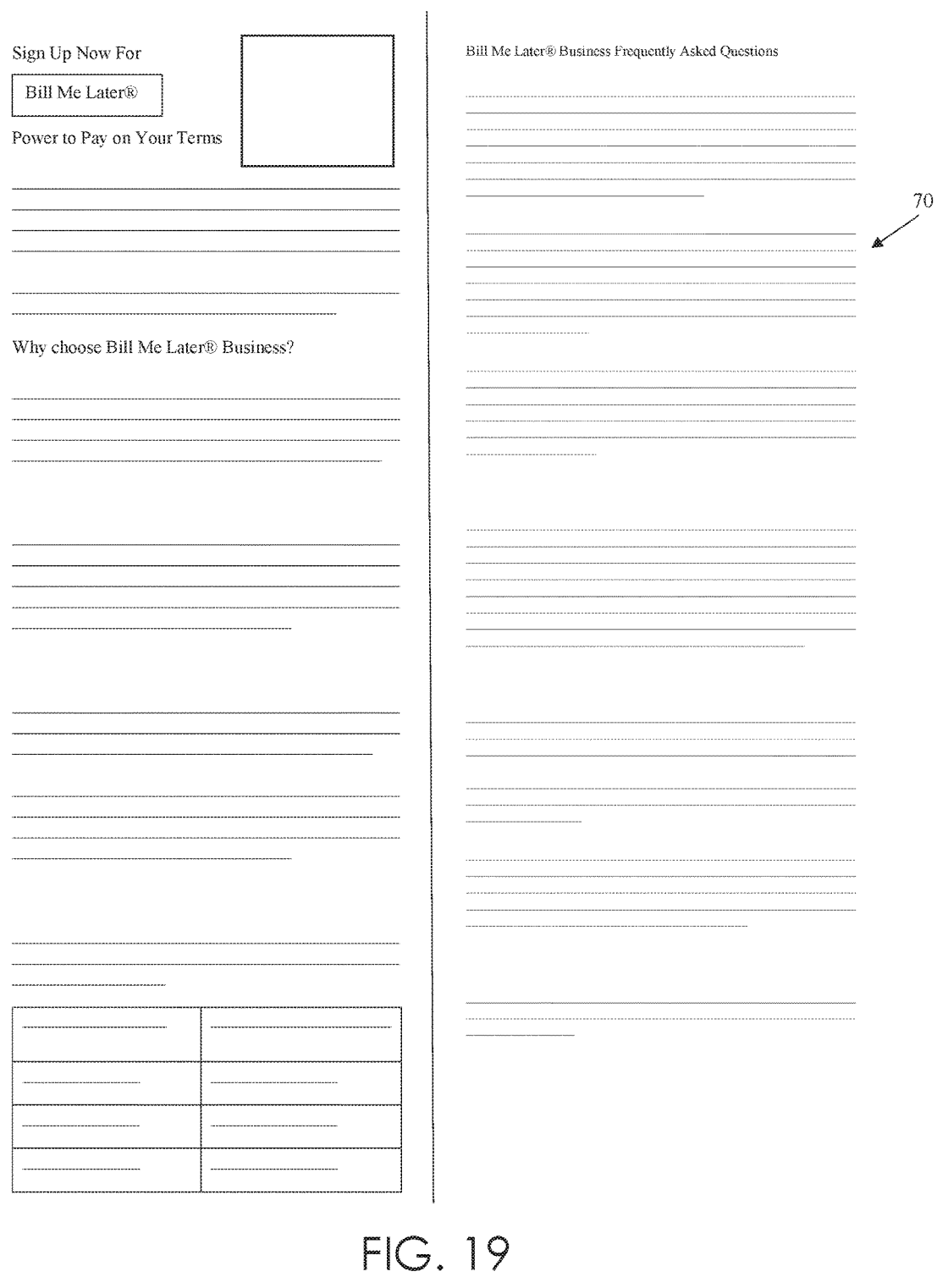

As discussed above, and throughout the various screenshots displayed, certain selectable portions 52 allow the user to make decisions and/or obtain additional information during the application and transaction T process. FIG. 19 illustrates an informational page 70, which provides the user with a description of the credit account 18 that is being established between the provider P and the business entity B. This informational page 70 may also include frequently asked questions (FAQs) or other information discussing the credit-based relationship R.

In one exemplary embodiment, there are three authorization messages that are provided by the system to the provider P and/or the business entity B. In particular, the new "account" message is used when customers indicate that they do not already have an existing credit account 18. A default account number is assigned and used by the customer for the first purchase, and the system 10 displays specified web pages to the new customer as described above. In this variation, the collection and use of the business entity data set 12 (optionally including the personal guarantor information) is provided. If the customer has an existing account, the pre-existing system 10 account number may be used, and the customer is required to enter his or her username 20 and password 22. Finally, a "back office" authorization may be used to reauthorize or add-on to existing authorizations, which may be used when certain fulfillment or back office systems in the customer are not present. This process utilizes the customer's account number, and does not require customer consent for credit review, since no credit review is performed.

Further, in this exemplary embodiment, there are certain validation and data requirements in order to process the transaction T. For initial transactions T, where there is no account number established, individually-specific and properly formatted name and address data is required. Further, the billing address provided is used to access a customer's credit information, as well as to establish the credit account 18. A complete address is often required for both credit scoring and statement delivery functions. Example validation requirements for an administrator or personal guarantor are found in Table 1.

TABLE 1

Validation Requirements

There must be a first name and a last name
Each name must consist of two or more characters
If and only if a name consists of three or more characters, it must contain a vowel (for this purpose, A, E, I, O, U and Y are vowels)
Special characters other than dash (-), period (.) and apostrophe (.) are invalid
Names containing the word .and. are invalid (e.g. Jack and Jill.)
Last names that include Inc., Incorporated., Corp., Corporation or LLC are invalid With respect to the customer address, a complete United States address may be required to access the customer's credit bureau file and for deliverability of the statement. Although the system 10 may validate that the area code matches the state (and perform a lookup on the customer address), in some instances a city/state/zip code match should be performed prior to submitting the transaction T. Example validation requirements for the customer address are found in Table 2.

TABLE 2

Validation Requirements

Address line 1 must contain a numeric value and an alphabetical character
If you have separate fields for Address Line 1 and Address Line 2, you should ensure that Address Line 1 contains, at a minimum, the building number and street name.
Unless you perform USPS validation and standardization on the address (e.g. convert "street" to "ST"), you must pass both address line 1 and address line 2 exactly as entered by the customer. Do not concatenate address line 1 and address line 2. Do not truncate either address line to fewer than 30 characters.

With respect to the customer phone number, it is preferable to use a home phone number, and a 10-digit phone number may be required. Example validation requirements for the phone number data are found in Table 3. In addition, and with respect to any of the validation requirements, an error message may be displayed to the customer if the appropriate requirements are not met.

TABLE 3

Validation Requirements

The phone number must be 10 digits in length
The area code must not be:
equal to or less than 200
equal to or greater than 990
equal to 666
A toll free area code (800, 811, 822, 833, 844, 855, 866, 877, 888, 899)
The exchange (second three digits) must not equal 555 or start with 1

TABLE 3-continued

Validation Requirements (e.g. xxx-555-xxxx or xxx-1xx-xxxx)
The last seven digits must not be identical (e.g. xxx-111-1111)
International phone numbers: i.e. Canada With respect to the e-mail address, when using the system 10 in connection with an online or electronic transaction T, this data field 14 is required. However, for call center transactions T, the e-mail address may or may not be required. Example validation requirements for the e-mail address are found in Table 4. Still further, various Top Level Domains and specific country codes may be accepted while other less used or obscure codes may be denied (or further verified or validated).

TABLE 4

Validation Requirements

The format of the address must be: username@domain.extension.
Derivations such as user.name@subdomain.domain.extension are allowed.
There must not be any spaces or other restricted characters in the address.
Merchants should not enter a dummy address, such as none@none.com.

In this embodiment, the Internet Protocol address is used as part of the fraud screening process. Authorizations may also be declined where the ship-to address fails certain look-ups and checks. Additional data fields may also be supplied in connection with the transaction T, and these data fields 14 may be part of the business entity data set 12 and/or the transaction data set 16. As discussed above, these data fields 14 may include personal guarantor information, sales channel information, terms and condition version, and item category code.

Often, item category codes assist in the fraud monitoring and prevention process, where the general contents of the order are analyzed. In this non-limiting embodiment, only one item category code is used for authorization requests, and in the event of multiple products, the item category code of the highest ticket-priced item would be used. Further, if a gift certificate is contained in the order, it would take precedence over the other items, and the item category code of a gift certificate should be passed. Table 5 illustrates a listing of item category codes used in this non-limiting embodiment.

TABLE 5

| Code | Category Description |
|------|----------------------|
| 1000 | Books |
| 1050 | Magazines |
| 1100 | Magazine Subscriptions |
| 1120 | Wine and Beer |
| 1130 | Distilled Spirits |
| 1140 | Fine Recreational Consumables |
| 1200 | Prescription Drugs |
| 1210 | Ethical Drugs |
| 1220 | Medical - Supplies |
| 1230 | Medical - Equipment |
| 1240 | Diet & Fitness |
| 1250 | Personal Care |
| 1260 | Sexual Well-being |
| 1270 | Vision Care |
| 1280 | Veterinary Care |
| 1200 | AOL Pop Ups |
| 2000 | Electronics, Audio |
| 2100 | Electronics, Video |
| 2200 | Electronics, Computers |

TABLE 5-continued

| Code | Category Description |
|---|---|
| 2300 | Electronics, Other |
| 3000 | Recorded Music |
| 3100 | Recorded Video |
| 3500 | Camera & Photo |
| 3700 | Health & Beauty |
| 4000 | Housewares, Kitchen |
| 4050 | Housewares, Furniture |
| 4100 | Housewares, Rugs & Carpet |
| 4150 | Housewares, Appliances |
| 4200 | Housewares, Bed & Bath |
| 4250 | Wine Accessories |
| 4500 | Tickets |
| 4600 | Delivered Gifts, Flowers |
| 4610 | Delivered Gifts, Plants |
| 4620 | Delivered Gifts, Food/Beverage |
| 4630 | Delivered Gifts, Other |
| 4700 | Gift Certificates |
| 4800 | Educational Services |
| 5000 | Software, Computer Games |
| 5050 | Software, Programming |
| 5100 | Software, Business & Professional |
| 5150 | Software, Home/Personal |
| 5400 | Toys & Games |
| 5450 | Hobby Supplies |
| 5500 | Sporting Goods |
| 5700 | Tools & Hardware |
| 6000 | Outdoor Living |
| 6300 | Automobiles, Parts |
| 6350 | Automobiles, Service |
| 6400 | Motorcycles |
| 6500 | Auction Goods |
| 6550 | Collectibles - Coins & Stamps |
| 6560 | Collectibles - Sports |
| 6570 | Collectibles - Art |
| 6580 | Collectibles - Other |
| 7060 | Travel, Accessories |
| 7150 | Travel, Entertainment |
| 7200 | Travel, Dining |
| 7400 | Subscriptions, Narrowband, ISP |
| 74XX | Subscriptions, Narrowband, ISP (Variations) |
| 7500 | Subscriptions, Broadband, ISP |
| 75XX | Subscriptions, Broadband, ISP (Variations) |
| 7600 | On-line Delivery - Books |
| 7650 | On-line Delivery - Music |
| 7700 | On-line Delivery - Software |
| 7750 | On-line Delivery - Video |
| 7800 | On-line Delivery - Photos |
| 7850 | On-line Delivery - Periodicals |
| 8000 | Musical Instruments |
| 8050 | Musical Instrument Accessories |
| 8100 | Sheet Music |
| 8200 | Groceries, Gourmet |
| 8250 | Groceries, General |
| 8300 | Groceries, Convenience |
| 8400 | Fuel |
| 8600 | Jewelry - fashion |
| 8610 | Jewelry - fine |
| 8620 | Jewelry - Loose Diamonds |
| 8700 | Clothing, children's |
| 8750 | Clothing, Men's |
| 8760 | Clothing, Men's Accessories |
| 8800 | Clothing, Women's |
| 8810 | Clothing, Women's Accessories |
| 8850 | Clothing, Teen's |
| 8860 | Clothing, Teen's Accessories |
| 8900 | Shoes |
| 9000 | Recreational Supplies |

Also provided within the context of the system 10 is the product delivery type, which indicates how the majority of the product in the order was delivered. Examples of valid delivery types include physically delivered products, digitally-loaded products, service, cash-and-carry and default for other types of delivery. A customer registration date may be supplied, and this indicates when the business entity first began using the merchant's or provider's website. Customer flag information may be used to indicate whether the business entity is a new customer or an existing customer, and this flag affects the underwriting process of the system 10.

Additional information that may be supplied in this exemplary embodiment includes the date-of-birth of the personal guarantor. Example validation requirements for this data field 14 are set forth in Table 6. Social security information of the personal guarantor may also be required, and the example validation requirements for this data field 14 are found in Table 7. A further data field 14 that may be provided to the system 10 from either the business entity B and/or the merchant M is the shipping cost, and which party is to bear the costs associated with the delivery of the goods. In addition, the authorization amount provided should include the grand total of the purchase, which would include the tax and shipping costs. Accordingly, the entire amount of the order should be authorized including back-ordered items.

TABLE 6

| Validation Requirements |
|---|
| Values indicating that the customer is under age 18 will result in a format decline. |
| The earliest date that can be accepted is Jan. 1, 1900. |
| Unless you have a specific pre-existing business purpose for retaining this information, you are required to purge DOB from your system once the transaction is complete. |

TABLE 7

| Validation Requirements |
|---|
| SSN is invalid if it has blank or alpha characters |
| The SSN can not have fewer than 4 digits |
| SSN is invalid if it has all zeros ("0000" is invalid) |
| Unless you have a specific pre-existing business purpose for retaining this information, you are required to purge SSN from your system once the transaction is complete. |

Various data fields 14 that may be provided from the provider P to the system 10 are set forth in Table 8, where A=All, E=Existing Accounts and N=New Accounts. Similarly, and in this exemplary embodiment, the data fields 14 supplied by the business entity B are found in Table 9.

TABLE 8

| Field Name | Format | Required | Usage |
|---|---|---|---|
| Method of Payment | A/N(2) | A | Merchant Product Identification. Supply "BL". |
| Payment Division | N(10) | A | Assigned by I4 Commerce. Used to identify core vs promotional financing. |
| I4 Merchant ID | N(15) | A | Assigned by I4 Commerce. Used to identify core vs. promotional financing. |

TABLE 8-continued

| Field Name | Format | Required | Usage |
| --- | --- | --- | --- |
| Merchant Order Number | A/N(22) | A | Merchants internal order number. Supply the same number for subsequent authorizations to use the order add-on functionality. Contact I4 Commerce for more information. |
| Customer Authenticated by Merchant | A/N(1) | A | Flag that user has logged into site successfully |
| Back Office Processing Flag | A/N(1) | A | Indicates that the transaction was submitted in the back office processing and the customer did not initiate. Y/N default = N. If = Y then Account Number must be provided and User ID and PIN is not required for authentication. If the User ID and PIN is required it will be validated. If Y and Account number not provided then will fail with 216. |
| Account Number | A/N(16) | A | Not required. If the account number is not supplied, the default account number must be sent. 5049900000000000 |
| Authorization Amount | N(10v2) | A | |
| Channel Indicator | A/N(1) | A | |
| Shipping Amount | N(6v2) | A | |
| Terms and Conditions Code | N(5) | A | |
| Customer Registration Date | N(8) | A | |
| Delivery Method | A/N(3) | A | |
| IP Address | A/N(15) | A | |
| Customer Type | A/N(2) | A | |
| Item Category | N(4) | A | |
| Pre-Approval Invitation Number | N(16) | A | |
| Promotion Code | A/N(4) | A | |
| Merchant Reference ID | A/N(22) | A | Tracking an application request for pending status |
| Business Purchase Order Number | A/N(20) | R | For Net30 Product |
| Business Loan Type - Lease, Revolve, Invoice | A/N(3) | A | Revolving will be used for launch |
| ST = BT Name Indicator | A/N(1) | A | |
| Ship-to Name | A/N(30) | A | Req'd if PHY and ST equal BT is false |
| ST = BT Address Indicator | A/N(1) | A | |
| Ship-to Address 1 | A/N(30) | A | Req'd if PHY and ST equal BT is false |
| Ship-to Address 2 | A/N(30) | A | Req'd if PHY and ST equal BT is false |
| Ship-to City | A/N(30) | A | Req'd if PHY and ST equal BT is false |
| Ship-to State | A/N(30) | A | Req'd if PHY and ST equal BT is false |
| Ship-to Zip | A/N(30) | A | Req'd if PHY and ST equal BT is false |

TABLE 9

| Field Name | Format | Required | Usage |
| --- | --- | --- | --- |
| Business Legal Name | A/N(20) | E | Name used for underwriting |
| DBA Name | A/N(35) | E | Alternate used on communication |
| Business Address 1 | A/N(30) | E | |
| Business Address 2 | A/N(30) | E | |
| Business City | A/N(30) | E | |
| Business State | A/N(2) | E | |
| Business Zip | A/N(9) | E | |
| Business Main Telephone Number | N(10) | N | |
| User ID | A/N(50) | N | |
| PIN | A/N(24) | N | |
| Administrator First Name | A/N(30) | E | This is the person who is applying for the business |
| Administrator Last Name | A/N(30) | E | This is the person who is applying for the business |
| Administrator Phone | N(10) | E | |
| Administrator Fax | N(14) | E | |
| Administrator Email | A/N(50) | E | |
| Administrator Title | A/N(10) | N | |
| Supervisor Name | A/N(30) | N | alternate contract for FYI purchase emails and escalation |
| Supervisor Email Address | A/N(50) | N | |
| Business D&B Number | A/N(9) | N | ?is it needed for lease? |
| Business Tax ID | N(9) | N | Will always be EIN regardless of business type. |

TABLE 9-continued

| Field Name | Format | Required | Usage |
|---|---|---|---|
| Business NAICS Code | A/N(6) | N | NAICS Code |
| Business Type | A/N(3) | N | CRP = Corporation, PRN = Partnership, PRO = Sole Proprietorship, SCP = Scorp, LLC = LLC, LLP = LLP, NPR = Non Profit, GVT = Government, SCH = School/Education, OTH = Other |
| Business Years in Business | N(3) | N | |
| Business Number of Employees | N(6) | N | |
| PG Last name | A/N(35) | N | |
| PG First name | A/N(35) | N | |
| PG SSN | A/N(9) | E | Will be SSN for Proprietor, Partner, or PG |
| PG DOB | Date CCYYMMDD | E | |
| PG Income Currency Type | A/N(3) | E | |
| PG Annual Income | N(8)v2 | E | |
| PG Residence Status | A(1) | E | Own, Rent, or Other (X). |
| PG Checking Indicator | A(1) | E | T/F |
| PG Savings Indicator | A(1) | E | T/F |
| PG Years at Employer | N(2) | E | |
| PG Years at Residence | N(2) | E | |
| PG Home Address 1 | A/N(30) | N | |
| PG home Address 2 | A/N(30) | N | |
| PG Home City | A/N(30) | N | |
| PG Home State | A/N(2) | N | |
| PG Home Zip | A/N(9) | N | |
| PG Email Address | A/N(50) | N | |
| PG Home Phone Number | N(10) | N | |
| PG Title | A/N(10) | N | |

In some instances additional requirements may be included in order to authorize a transaction T. For example, the method and system 10 of the present invention may only be available to customers in certain areas of the world or states. In addition, certain response codes may be returned to the merchant M and/or the business entity B, such as the requirement of a personal guarantor, an invalid username 20 and/or an invalid password 22, etc.

In another aspect, the merchant M or the provider P may offer promotional financing. Promotionally-financed purchases have different "interchange" terms from regular purchases, and therefore require different identifiers of the provider P or merchant M. To enable promotional financing, specific transactions T must be qualified using different identifiers. Further, the provider P or merchant M web page, such as in the form of the payment interface 28, may be modified in order to effectively utilize promotional financing. For example, qualification for the promotion may be based upon the total amount of the shopping cart, not the amount after a gift card is used.

In order to process the payment for the goods or services provided by the merchant M to the business entity B in connection with a credit-based relationship R include a variety of data fields 14. For example, an authorization response may be provided, which would include a three-digit authorization response code and a six-digit numerical authorization control code. Data regarding cancelled or voided orders, as well as add-ons to the original authorization can be processed. For example, an add-on may be made without reauthorizing the original purchase for up to a specified amount or a percentage of the total order. The same merchant order number may be passed. Certain transactions T may be re-authorized if the original authorization was obtained greater than 30 days past or if the add-on is greater than 10%. Further, real-time authorization can be performed for shipments, or back authorization can be used for existing account transactions T. In one instance, it is not necessary to reauthorize on a set period in the event of extended time frames for backorders.

In this payment process, returns and credits may be handled similarly to credit card transactions, and a merchandise credit may be issued if an order is returned to a physical store location. In one exemplary embodiment, authorizations of the system 10 are valid for a set period, e.g., 30 days, and a single authorization may be matched up against many settlements. For example, if part of an order is shipped and settled, the remainder may be shipped and settled without reauthorizing, as long as it occurs within 30 days of the original authorization. At the time of the purchase, the entire value of the order should be authorized, including backordered items, as long as it is reasonably expected to complete the orders within 30 days. After 30 days, the remaining items should be authorized prior to shipment.

In one embodiment, and since the system 10 will be making lending decisions to business entities B at the point-of-sale, the presentation or offer of the credit account 18 may be subject to various legal and compliance requirements. To ensure legal and contractual compliance, the interactive interface 24 and/or payment interface 28 should be carefully formatted and presented to the business entity B. For example, references to the establishment of the credit account 18, the provider P and/or the credit issuer CI, etc. may be provided via a hyperlink to a window that contains a brief overview of the features and benefits. Further, promotional financing information may also be displayed to the business entity B, such that the customer is aware of payment requirements. As discussed above, FAQs may also be provided.

With respect to the payment interface 28, certain information or explanation may be required in order to satisfy specific laws and requirements. In this embodiment, in order to use the method and system 10, certain compliance requirements may be used as found in Table 10. When using a radio button or other mechanism to select the use of the system 10 as the payment method, certain compliance requirements are found in Table 11. Still further, Table 12 exhibits exemplary compliance requirements for one offering promotional financing.

TABLE 10

Compliance Requirements

BMLB must be the first or second payment option presented to customers
Display Bill Me Later Business ® in bolded black text
Display the BMLB logo
All Bill Me Later Business ® references must have a superscripted registered trademark
Display the tag line "Buy Fast. Feel Secure. ®"

TABLE 11

Compliance Requirements

Ensure that credit card and BMLB cannot be selected at the same time
BMLB cannot be presented if a non-US billing or shipping address has been entered.
The definition of US address for this purpose is the following:
The fifty states, the District of Columbia and Puerto Rico
Military addresses (state codes AA, AE and AP)
Ensure that BMLB is not added to a drop down list of credit cards

TABLE 12

Compliance Requirements

Additional messaging must be shown below the BMLB method of payment that shows that the purchase qualifies for the offer
The message should only be available to orders that qualify. If an order does not qualify, the message should not be shown
The message must read:
☑ Yes, I'd like No Payments on purchases over $xxx!
The checkbox must be check by default of the order qualifies. If a customer does not want the offer, they must deselect the checkbox to opt out Still further, in one non-limiting embodiment, various messages are provided to the business entity B (or customer). For example, when authorizing occurs in real time, most of the responses may take a very short period of time. However, a "processing" message may be provided to customers to reassure them that the transaction T is being processed normally, and to prevent duplicate submissions. An "approval" message may be provided if the credit-based relationship R is effectively established. A "decline" message may be provided to those that are denied such establishment. For privacy reasons, the specific grounds, e.g., poor credit, no credit report on file, verification failure, are not normally disclosed to the merchant M. When a "decline" message is provided, the business entity B or customer should be redirected to another form of payment.

The present method and system 10 may also be used in connection with transactions T that are obtained through a call center. In this embodiment, the call center or the provider P or merchant M may require certain integration with or communication with the system 10, e.g., the intermediate payment system 36, the payment processor 44 and/or the credit issuer system 40, etc. However, when using a call center in the transaction T, the data fields 14 discussed above may be required, as well as the verification of the same. In order to ensure compliance with various laws and requirements, an automated script may be provided to call center representatives.

As discussed above, the system 10 may also include various processes for fraud avoidance, fraud protection, fraud identification, verification and integration. In this manner, the method and system 10 of the present invention provides an innovative and unique process for establishing a credit-based relationship R between a business entity B and a provider P. In addition, the system 10 facilitates commercial transactions T between certain purchasing entities and merchants M. Still further, the system 10 may be used in connection with electronic or online commercial transactions T, and includes the appropriate processes for effecting the commercial transaction T between contracting parties. Still further, the present invention provides secure communications and facilitates transactions T in electronic, online, telephone or remote environment.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system of a service provider comprising:
a non-transitory memory; and
one or more hardware processors coupled to the non-transitory memory and configured to read instructions from the non-transitory memory to cause the system to perform operations comprising:
receiving, from a first business entity via a secured webpage of the first business entity displayed on a device associated with a second business entity, a request for performing an electronic payment transaction associated with a first amount between the first business entity and the second business entity, wherein the request is initiated based on a user input on the secured webpage from the device, wherein the secured webpage comprises a particular web layout specific to the first business entity;
in response to receiving the request, automatically generating a Uniform Resource Locator (URL) redirect request for redirecting the secured webpage to a payment interface, wherein the URL redirect request causes the payment interface to be integrated within a frame of the secured webpage of the first business entity while retaining the particular web layout in the secured webpage, wherein the payment interface is accessed from a secure source associated with the service provider that is independent from the first business entity and the second business entity, wherein the payment interface enables the second business entity to submit data related to the second business entity and the electronic payment transaction to the service provider via the secured webpage of the first business entity;
receiving, via the payment interface, the data submitted by the second business entity;
obtaining, via the payment interface displayed within the frame of the secured webpage, an Internet Protocol (IP) address of the device;

providing a messenger service platform to facilitate communication of electronic messages between the first business entity and the second business entity;

obtaining one or more electronic documents based on a transaction type of the electronic payment transaction;

transmitting, via the messenger service platform, the one or more electronic documents to the first business entity and the second business entity to obtain digital signatures from the first business entity and the second business entity;

receiving, via the secured webpage from the first business entity, an authorization request corresponding to the electronic payment transaction between the first business entity and the second business entity;

authorizing the electronic payment transaction by validating the data submitted by the second business entity, validating the digital signatures received from the first business entity and the second business entity, and determining the IP address of the device does not correspond to a fraudulent user account, wherein the authorizing comprises establishing, for the second business entity, a credit account with the service provider based on the first amount;

in response to authorizing the electronic payment transaction, communicating an authorization response comprising an account number of the credit account to the first business entity;

receiving, from the first business entity via the secured webpage, an add-on to the electronic payment transaction, wherein the add-on is associated with a second amount;

determining the second amount associated with the add-on is within a predetermined portion of the first amount associated with the electronic payment transaction; and processing the electronic payment transaction and the add-on to the electronic payment transaction using the credit account of the second business entity without reauthorizing.

2. The system of claim 1, wherein the authorization response comprises an authorization response code indicating to the first business entity that the electronic payment transaction is authorized.

3. The system of claim 1, wherein the operations further comprise determining that the add-on is requested within a predetermined time period from the authorization request.

4. The system of claim 3, wherein the predetermined time period is 30 days.

5. The system of claim 1, wherein the predetermined portion is 10%.

6. The system of claim 1, wherein the operations further comprise receiving, from the first business entity, an indication that items associated with the electronic payment transaction and the add-on are shipped within a second predetermined time period from the authorization request, wherein the electronic payment transaction and the add-on are processed based on the indication.

7. The system of claim 6, wherein the second predetermined time period is 30 days.

8. The system of claim 1, wherein the operations further comprise reauthorizing the electronic payment transaction with the add-on when the second amount associated with the add-on is more than the predetermined portion of the first amount.

9. A non-transitory machine-readable medium having stored thereon machine-readable instructions executable to cause a machine to perform operations comprising:

receiving, from a first business entity via a secured webpage of the first business entity displayed on a device associated with a second business entity, a request for performing an electronic payment transaction between the first business entity and the second business entity, wherein the request is initiated based on a user input on the secured webpage from the device, wherein the secured webpage comprises a particular web layout;

in response to receiving the request, automatically generating a Uniform Resource Locator (URL) redirect request for redirecting the secured webpage to a payment interface, wherein the URL redirect request causes the payment interface to be integrated within a frame of the secured webpage of the first business entity while retaining the particular web layout in the secured webpage, wherein the payment interface is accessed from a secure source associated with a service provider independent from the first business entity and the second business entity, wherein the payment interface enables the second business entity to submit data related to the second business entity and the electronic payment transaction to the service provider via the secured webpage of the first business entity;

receiving, via the payment interface, the data submitted by the second business entity;

obtaining, via the payment interface displayed within the frame of the secured webpage, an Internet Protocol (IP) address of the device;

providing a messenger service platform to facilitate communication of electronic messages between the first business entity and the second business entity;

obtaining one or more electronic documents based on a transaction type of the electronic payment transaction;

transmitting, via the messenger service platform, the one or more electronic documents to the first business entity and the second business entity to obtain digital signatures from the first business entity and the second business entity;

receiving, via the secured webpage from the first business entity, an authorization request corresponding to the transaction between the first business entity and the second business entity;

authorizing the electronic payment transaction by validating the data submitted by the second business entity, validating the digital signatures received from the first business entity and the second business entity, and determining the IP address of the device does not correspond to a fraudulent user account, wherein the authorizing comprises establishing, for the second business entity, a credit account with the service provider based on the first amount;

in response to authorizing the electronic payment transaction, communicating an authorization response comprising an account number of the credit account to the first business entity;

receiving, from the first business entity via the secured webpage, an add-on to the electronic payment transaction;

determining the second amount associated with the add-on is within a predetermined portion of the first amount associated with the electronic payment transaction; and processing the electronic payment transaction and the add-on without reauthorizing.

10. The non-transitory machine-readable medium of claim 9, wherein the authorization response comprises an authorization response code indicating to the first business entity that the electronic payment transaction is authorized.

11. The non-transitory machine-readable medium of claim 9, wherein the operations further comprise determining that the add-on is requested within a predetermined time period from the authorization.

12. The non-transitory machine-readable medium of claim 11, wherein the predetermined time period is 30 days.

13. The non-transitory machine-readable medium of claim 9, wherein the predetermined portion is 10%.

14. The non-transitory machine-readable medium of claim 9, wherein the operations further comprise receiving, from the first business entity, an indication that items associated with the electronic payment transaction and the add-on are shipped within a second predetermined time period from the authorization request, wherein the electronic payment request and the add-on are processed based on the indication.

15. The non-transitory machine-readable medium of claim 9, wherein the operations further comprise in response to communicating the authorization response, establishing a credit-based relationship between the first business entity and the second business entity, wherein the credit-based relationship is one of a credit account arrangement relationship, a credit product arrangement relationship, a line-of-credit arrangement relationship, a loan arrangement relationship, or a lease arrangement relationship.

16. A method comprising:
receiving, by a computing system of a service provider from a first business entity via a secured webpage of the first business entity displayed on a device associated with a second business entity, a request for initiating an electronic payment transaction associated with a first amount between the first business entity and the second business entity, wherein the request is initiated based on a user input on the secured webpage from the device, wherein the secured webpage comprises a particular web layout specific to the first business entity;
in response to receiving the request, generating, by the computing system, a Uniform Resource Locator (URL) redirect request for redirecting the secured webpage to a payment interface, wherein the URL redirect request causes the payment interface to be integrated within a frame of the secured webpage of the first business entity while retaining the particular web layout in the secured webpage, wherein the payment interface is accessed from a secure source associated with the service provider that is independent from the first business entity and the second business entity, wherein the payment interface enables the second business entity to submit data related to the second business entity and the electronic payment transaction to the service provider via the secured webpage of the first business entity;
receiving, by the computing system via the payment interface, the data submitted by the second business entity;
obtaining, by the computing system via the payment interface displayed within the frame of the secured webpage, an Internet Protocol (IP) address of the device;
providing, by the computing system, a messenger service platform to facilitate communication of electronic messages between the first business entity and the second business entity;
obtaining, by the computing system, one or more electronic documents based on a transaction type of the electronic payment transaction;
transmitting, by the computing system via the messenger service platform, the one or more electronic documents to the first business entity and the second business entity to obtain digital signatures from the first business entity and the second business entity;
receiving, by the computing system via the secured webpage from the first business entity, an authorization request corresponding to the transaction between the first business entity and the second business entity;
authorizing, by the computing system, the electronic payment transaction by validating the data submitted by the second business entity, validating the digital signatures received from the first business entity and the second business entity, and determining the IP address of the device does not correspond to a fraudulent user account, wherein the authorizing comprises establishing, for the second business entity, a credit account with the service provider based on the first amount;
in response to authorizing the electronic payment transaction, electronically communicating, by the computing system, an authorization response comprising an account number of the credit account to the first business entity;
receiving, by the computing system from the first business entity via the secured webpage, an add-on to the electronic payment transaction, wherein the add-on is associated with a second amount;
determining, by the computing system, the second amount associated with the add-on is within a predetermined portion of the first amount associated with the electronic payment transaction; and
processing, by the computing system, the electronic payment transaction and the add-on without performing a reauthorization of the authorization request.

17. The method of claim 16, further comprising determining that the add-on is requested within a predetermined period of time from the authorization request.

18. The method of claim 17, wherein the predetermined portion is 10%.

19. The method of claim 16, wherein the authorization response is provided in a pop up window in association with the secured webpage.

20. The method of claim 16, wherein the authorization response is embedded within the frame of the secured webpage associated with the first business entity.

* * * * *